United States Patent
Kwon

(10) Patent No.: US 9,667,355 B2
(45) Date of Patent: May 30, 2017

(54) METHOD AND USER EQUIPMENT FOR REMOVING INTERFERENCE IN WIRELESS COMMUNICATION SYSTEM

(71) Applicant: LG ELECTRONICS INC., Seoul (KR)

(72) Inventor: Byunguk Kwon, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/820,089

(22) Filed: Aug. 6, 2015

(65) Prior Publication Data

US 2017/0041085 A1 Feb. 9, 2017

(51) Int. Cl.
| | |
|---|---|
| *H04B 1/00* | (2006.01) |
| *H04B 15/00* | (2006.01) |
| *H04W 72/04* | (2009.01) |
| *H04W 88/02* | (2009.01) |

(52) U.S. Cl.
CPC ........ *H04B 15/00* (2013.01); *H04W 72/0453* (2013.01); *H04W 88/02* (2013.01)

(58) Field of Classification Search
CPC .. H04J 11/005; H04J 11/0023; H04J 11/0069; H04J 1/02; H04L 5/0073; H04L 5/0035; H04L 5/0048; H04L 5/0053; H04L 2025/03414; H04L 25/0224; H04L 25/03159; H04L 25/03343; H04L 27/2608; H04L 27/2647; H04L 5/0023; H04L 5/0032; H04L 5/0044; H04L 5/005; H04L 5/0051; H04L 5/0094; H04W 24/08; H04W 72/005; H04W 72/082; H04W 24/10; H04W 52/34; H04W 72/042; H04W 72/0446; H04W 16/02; H04W 16/06; H04W 24/02; H04W 28/16; H04W 36/0061; H04W 36/0088; H04W 36/0094; H04W 48/10; H04W 48/16; H04W 56/00
See application file for complete search history.

(56) References Cited

U.S. PATENT DOCUMENTS

| | | | | |
|---|---|---|---|---|
| 2009/0147892 A1* | 6/2009 | Lee | ..................... | H04L 27/2647 375/346 |
| 2009/0285325 A1* | 11/2009 | Zhou | ..................... | H04B 7/0854 375/267 |
| 2014/0086095 A1* | 3/2014 | Jung | ..................... | H04J 11/0023 370/252 |
| 2014/0086371 A1* | 3/2014 | Li | ......................... | H04J 11/005 375/346 |
| 2014/0204765 A1* | 7/2014 | Chai | ..................... | H04W 24/08 370/241.1 |

* cited by examiner

*Primary Examiner* — Golam Sorowar

(74) *Attorney, Agent, or Firm* — Birch, Stewart, Kolasch & Birch, LLP

(57) ABSTRACT

An embodiment of the present invention provides a method for removing interference. The method for removing interference may include obtaining PBCH information by decoding PBCH transmitted by a cell that neighbors a serving cell to cause interference in a received signal, estimating a channel for PBCH based on the obtained PBCH information, generating an interference signal based on the PBCH information and the estimated channel for PBCH, and removing the generated interference signal from the received signal.

6 Claims, 38 Drawing Sheets

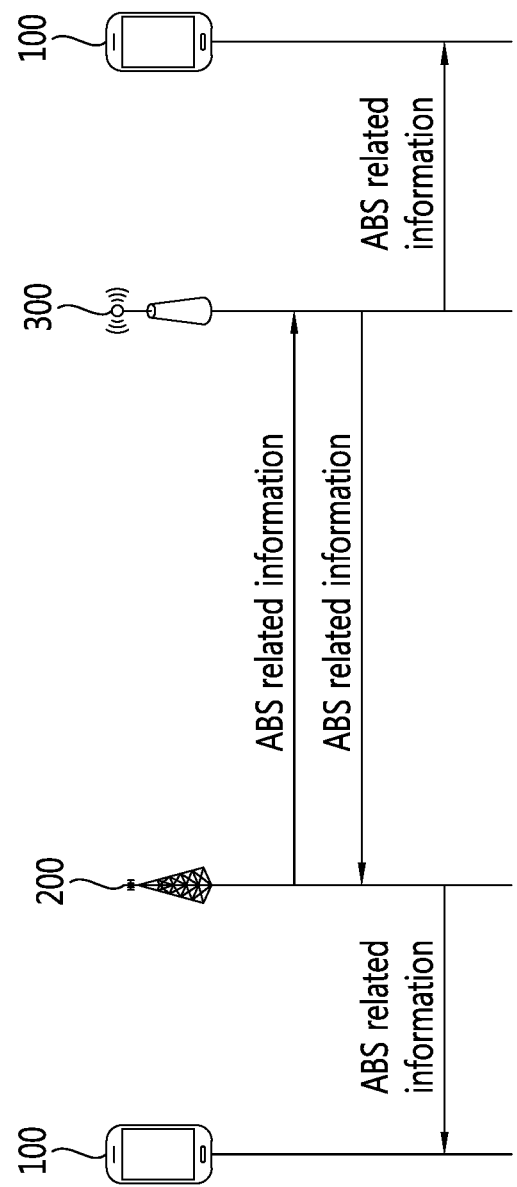

METHOD AND USER EQUIPMENT FOR REMOVING INTERFERENCE IN WIRELESS COMMUNICATION SYSTEM

BACKGROUND OF THE INVENTION

Field of the Invention

The disclosure of the present specification relates to a method and User Equipment (UE) for removing interference.

Related Art

A 3rd Generation Partnership Project (3GPP) Long Term Evolution (LTE) that improves a Universal Mobile Telecommunications System (UMTS) has been introduced to a 3GPP release 8. The 3GPP LTE uses an Orthogonal Frequency Division Multiple Access (OFDMA) in a downlink and a Single Carrier-Frequency Division Multiple Access (SC-FDMA) in an uplink. The OFDM needs to know in order to understand the OFDMA. The OFDM may be used since an inter-symbol interference effect can be reduced due to low complexity. The OFDM converts data to be input in serial into N parallel data and transmits it by carrying N orthogonal sub-carriers. The sub-carriers maintains orthogonally in a frequency dimension. Meanwhile, the OFDMA means a multiple access method to realize multiple accesses by providing a part of the available sub-carrier to each user independently, in a system using the OFDM in a modulation scheme.

In recent years, there is an ongoing discussion on 3GPP LTE-advanced (LTE-A) evolved from the 3GPP LTE.

Also, recently, a heterogeneous network in which a macro cell and a small cell coexist are under discussion. In particular, discussions for bypassing traffic by distributing a terminal connected to a macro cell to a small cell are in progress.

Meanwhile, interference may further increase due to such a small cell, and thus, interference removal capability (or an interference cancellation capability) is urgently required.

SUMMARY OF THE INVENTION

The present invention has been made to solve the above-mentioned problems.

In detail, an embodiment of the present disclosure provides a method for effectively canceling interference, and a terminal.

To achieve the aforementioned purpose, a method for removing interference by a UE in a wireless communication terminal according to a disclosure of the present specification may include receiving a signal from a serving cell; obtaining Physical Broadcast CHannel (PBCH) information by decoding PBCH, which is transmitted from a cell adjacent to the serving cell to cause interference in the received signal; estimating a channel for PBCH based on the obtained PBCH information; generating an interference signal based on the PBCH information and the estimated channel for PBCH; and removing the generated interference signal from the received signal.

The PBCH information may be obtained through channel estimation based on a Cell specific Reference Signal (CRS).

Obtaining PBCH information by decoding PBCH may include estimating a channel value through a Least Square (LS) estimator based on a CRS in the frequency domain; removing noise from the channel value in the time domain; performing time interpolation on the noise-removed channel value through a time estimator; and decoding PBCH based on the time-interpolated channel value.

The LS estimator may operate in a predetermined frequency bandwidth and set a channel value corresponding to the frequency domain of a reception frequency bandwidth out of the predetermined frequency bandwidth as a channel value corresponding to the CRS location of both ends of the predetermined frequency bandwidth.

The predetermined frequency bandwidth may be a frequency bandwidth corresponding to 6 Resource Blocks (RBs).

Estimating a channel for PBCH may include performing channel estimation based on the signal and the PBCH information; producing an average of the channel estimates in a predetermined OFDM symbol section; and estimating a channel for PBCH by performing frequency interpolation on the produced average.

Estimating a channel may be performed through an LS estimator when there is a receive antenna port and through Space Frequency Block Coding (SFBC) decoding when there are two or four receive antenna ports.

The method for removing interference may further include generating an interference signal by at least one PBCH and first removing the generated interference signal from the received signal, when at least one neighbor cell other than a cell adjacent to the serving cell exists and signal strength of at least one PBCH transmitted by at least one neighbor cell is greater than signal strength of PBCH transmitted by the cell adjacent to the serving cell.

To achieve the above-mentioned purpose, a method for removing interference by a UE in a wireless communication system according to a disclosure of the present specification may include receiving a signal from a serving cell; generating a first interference signal from the received signal based on a first CRS, which is transmitted by a first neighbor cell adjacent to the serving cell to cause interference in the signal; removing the first interference signal from the signal; generating a second interference signal from the signal, from which the first interference signal is removed, based on a second CRS, which is transmitted by a second cell adjacent to the serving cell to cause interference in the signal; and removing the second interference signal from the signal from which the first interference signal is removed.

Here, signal strength of the interference signal by the first CRS may be greater than signal strength of the interference signal by the second CRS.

The method for removing interference may include first removing a component corresponding to a CRS transmitted by the serving cell from the received signal when signal strength of the CRS transmitted by the serving cell is greater than signal strength of the interference signal by the first CRS.

To achieve the aforementioned purpose, a method for removing interference by a UE including an Interference Rejection Combining (IRC) device in a wireless communication system according to a disclosure of the present specification, may include receiving a signal from a serving cell; generating an interference signal from the received signal based on an interference CRS, which is transmitted by a cell adjacent to the serving cell to cause interference in the signal; and inputting the signal obtained by removing the interference signal from the received signal to the IRC device, when a CRS transmitted by the serving cell collides with the interference CRS and the received signal includes Almost Blank Subframes (ABSs).

The method for removing interference may further include inputting a signal before removal of the interference signal to the IRC device when a CRS transmitted by the serving cell collides with the interference CRS and the received signal does not include ABSs.

Generating an interference signal may include estimating a reception channel for the serving cell; and generating the interference signal based on the estimated reception channel.

A path profile for estimating the reception channel may be updated by Infinite Impulse Response (IIR) filtering only when a CRS transmitted by the serving cell does not collide with the interference CRS and the received signal does not include ABSs.

The received signal may be divided into a first time section including ABSs and a second time section not including ABSs, and a complex IIR filter used to estimate the reception channel may be initialized only while a CRS transmitted by the serving cell does not collide with the interference CRS and during transition from one of the first and second time sections to the other.

Generating an interference signal may further include estimating noise for the received signal and reducing it, and a path profile for estimating the noise may be updated by IIR filtering only when a CRS transmitted by the serving cell collides with the interference CRS and the received signal includes ABSs.

A method for removing interference may further include adjusting a gain of an analog terminal for maintaining power of the received signal to a constant level, the gain of the analog terminal being adjustable only in a time section where the received signal does not include ABSs.

According to the disclosures of the present specification, an interference signal for PBCH is generated on the basis of PBCH information obtained by decoding PBCH transmitted from a cell adjacent to a serving cell, and PBCH interference by the adjacent cell is efficiently removed by eliminating the generated interference signal from the received signal, and thus data demodulation performance may be increased.

According to the disclosures of the present specification, complexity of channel estimation on an interference signal may be reduced, and efficiency in implementation may be increased by enabling channel estimation with relatively low complexity even when the number of interference signals to be estimated increases.

BRIEF DESCRIPTION OF THE DRAWINGS

FIG. 12B is a view illustrating an example of exchanging ABS subframe-related information.

DESCRIPTION OF EXEMPLARY EMBODIMENTS

Figure 1:
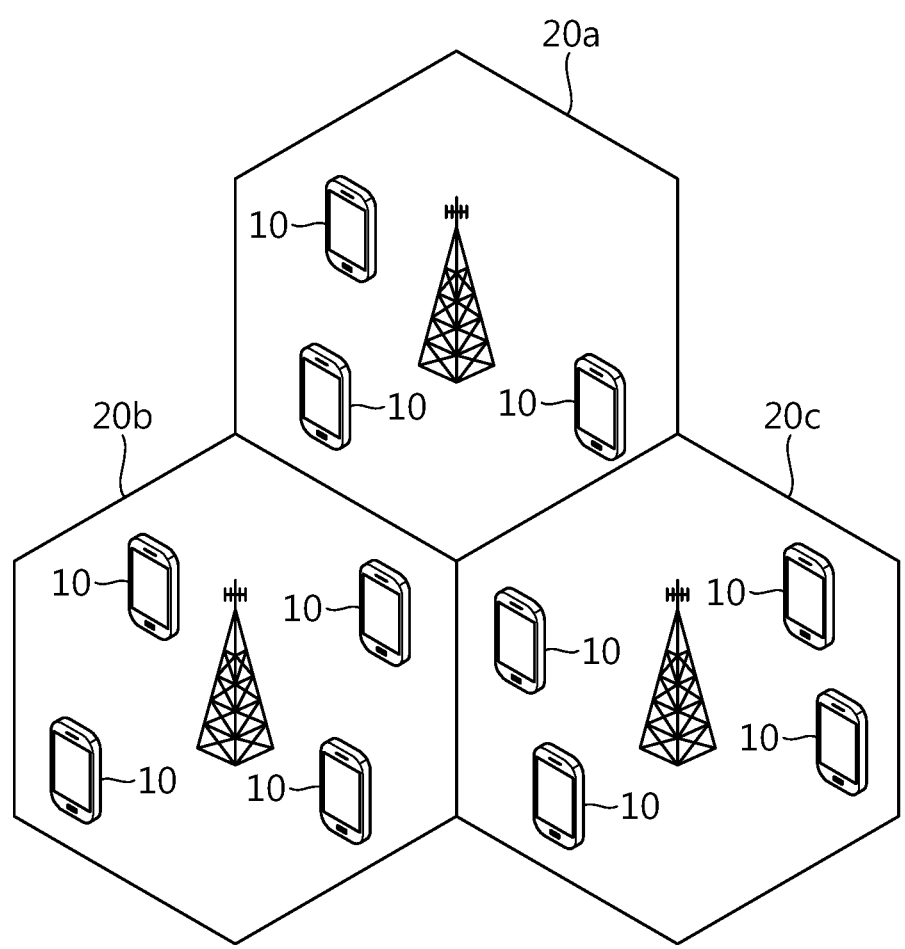
FIG. 1 illustrates a wireless communication system.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'wireless device' may be stationary or mobile, and may be denoted by other terms such as terminal, Mobile Terminal (MT), User Equipment (UE), Mobile Equipment (ME), Mobile Station (MS), User Terminal (UT), Subscriber Station (SS), handheld device, or Access Terminal (AT).

As used herein, 'base station' generally refers to a fixed station that communicates with a wireless device and may be denoted by other terms such as evolved-NodeB (eNB), Base Transceiver System (BTS), or access point.

Hereinafter, applications of the present invention based on 3rd Generation Partnership Project (3GPP) Long Term Evolution (LTE) or 3GPP LTE-A (advanced) are described. However, this is merely an example, and the present invention may apply to various wireless communication systems. Hereinafter, LTE includes LTE and/or LTE-A.

FIG. 1 shows a wireless communication system.

The wireless communication system 10 includes at least one base station (BS) 20. Respective BSs 20 provide a communication service to particular geographical areas 20a, 20b, and 20c (which are generally called cells). Each cell may be divided into a plurality of areas (which are called sectors). A User Equipment (UE) 10 may be fixed or mobile and may be referred to by other names such as Mobile Station (MS), Mobile Terminal (MT), User Equipment (UE), Subscriber Station (SS), wireless device, Personal Digital Assistant (PDA), wireless modem, handheld device. The BS 201 generally refers to a fixed station that communicates with the UE 10 and may be called by other names such as evolved-NodeB (eNB), Base Transceiver System (BTS), Access Point (AP), etc.

The UE generally belongs to one cell and the cell to which the UE belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the terminal 10 and an uplink means communication from the terminal 10 to the base station 20. In the downlink, a transmitter may be a part of the base station 20 and a receiver may be a part of the terminal 10. In the uplink, the transmitter may be a part of the terminal 10 and the receiver may be a part of the base station 20.

Meanwhile, the wireless communication system may be any one of a Multiple-Input Multiple-Output (MIMO) system, a Multiple-Input Single-Output (MISO) system, a Single-Input Single-Output (SISO) system, and a Single-Input Multiple-Output (SIMO) system. The MIMO system uses a plurality of transmit antennas and a plurality of receive antennas. The MISO system uses a plurality of transmit antennas and one receive antenna. The SISO system uses one transmit antenna and one receive antenna. The SIMO system uses one transmit antenna and one receive antenna. Hereinafter, the transmit antenna means a physical or logical antenna used to transmit one signal or stream and the receive antenna means a physical or logical antenna used to receive one signal or stream.

Figure 2:
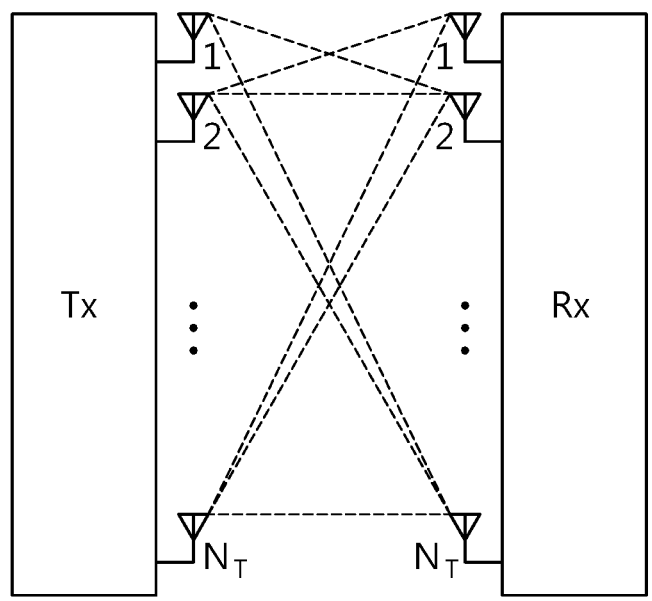
FIG. 2 is a view illustrating an antenna configuration of a multi-antenna system.

FIG. 2 illustrates a general multiple antenna system.

As shown in FIG. 2, when increasing the number of transmission antenna to $N_T$ and increasing the number of reception antenna to $N_R$ at the same time, a transmission rate can be increased and a frequency efficiency can be dramatically increased because a theoretical channel transmission capacity is increased in proportion to the number of antenna, unlike the case of using multiple antennas only in either one of transmitter or receiver.

The transmission rate due to the increase of channel transmission capacity may be theoretically increased by multiple of a maximum transmission rate $R_o$ in case of using an antenna and a rate increase $R_i$ as shown below.

$$R_i = \min(N_T, N_R) \quad \text{[Equation 1]}$$

Transmission information may include a maximum of $N_T$ number of different information items when the number of transmit antennas is $N_T$.

$$s = [s_1, s_2, \ldots, s_{N_T}]^T \quad \text{[Equation 2]}$$

In Equation 2, s denotes transmission information vector, and $s_1, s_2, \ldots, s_{N_T}$ denotes information items as elements of the transmission information vector. Each of the information items may be transmitted with different transmission power. When each transmission power is denoted as ($P_1, P_2, \ldots, P_{N_T}$), the transmission information vector to which transmission power is applied may be expressed as Equation 3 below.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

Equation 3 may be expressed as the product of a transmission power diagonal matrix and the transmission information vector, as expressed by Equation 4.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \qquad \text{[Equation 4]}$$

A weight matrix is multiplied to the transmission information vector with transmission power applied thereto to generate transmission signals $(x_1, x_2, \ldots, x_{NT})$ transmitted through the actual $N_T$ number of transmission antennas. The weight matrix W serves to appropriately distribute transmission information to individual antennas according to a transmission channel situation. When a transmission signal vector is x, x may be expressed as Equation 5 below.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & & \ddots \\ w_{N_T1} & w_{N_T2} & \cdots & w_{N_TN_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = \qquad \text{[Equation 5]}$$

$$W\hat{s} = WPs$$

In Equation 5, an element $w_{ij}$ ($1 \leq i \leq N_T$, $1 \leq j \leq N_T$) of the weight matrix denotes a weight value for $i^{th}$ transmission antenna and $j^{th}$ transmission information. The weight matrix W is also called a precoding matrix.

The transmission signal vector may include different transmission information according to a transmission technique. For example, when space diversity, i.e., transmission diversity, is applied, all of transmission information of transmission signal vectors may be the same. That is, $[s_1, s_2, \ldots, s_{nT}]$ may be the same information, for example, $[s_1, s_1, \ldots, s_1]$. Thus, since the same transmission information is transmitted to a receiver through different channels, a diversity effect is obtained and reliability of transmission increases.

Or, when space multiplexing is applied, all of transmission information of transmission signal vectors may be different. That is, $s_1, s_2, \ldots, s_{nT}$ may be different information. Since different transmission information is transmitted to a receiver through different channels, an amount of transmittable information may increase.

Also, transmission information may be transmitted using both space diversity and space multiplexing. That is, in the foregoing example, the same information may be transmitted through three transmission antennas by space diversity, while different information may be transmitted through the other remaining transmission antennas by space multiplexing. In this case, the transmission information vector may be configured as $[s_1, s_1, s_1, s_2, s_3 \ldots, s_{nT-2}]$, for example.

When a receiver has $N_R$ number of reception antennas, signals received by the individual reception antennas may be expressed as $y_n(1 \leq n \leq N_R)$. Here, the reception signal vector y may be expressed as Equation 6 below.

$$y = [y_1, y_2, \ldots, y_{N_R}]^T \qquad \text{[Equation 6]}$$

When channel remodeling is performed in a MIMO system, channels may be discriminated by an index of a transmission antenna and an index of a reception antenna. When the index of the transmission antenna is j and the index of the reception antenna is 1, a channel between the transmission antenna and the reception antenna may be expressed as $h_{ij}$ (An attention should be paid to the fact that the index of the reception antenna is first expressed and the index of the transmission antenna is expressed later in the subscript expressing the channel).

Figure 3:
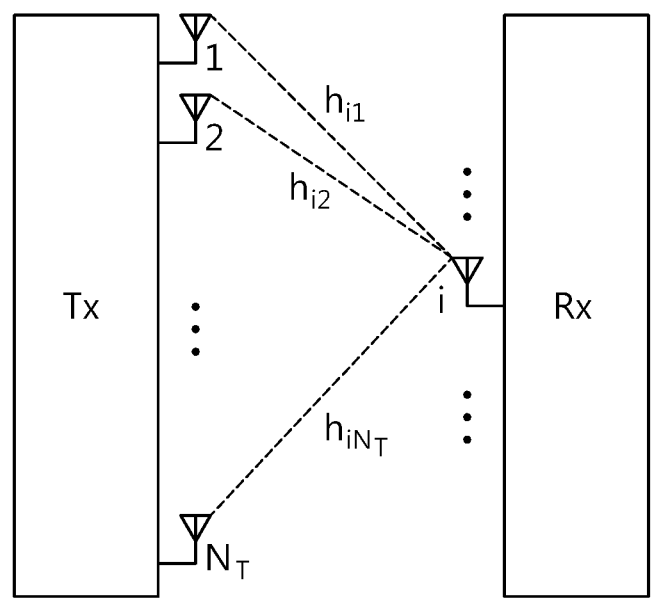
FIG. 3 is a view illustrating an example of a channel in the multi-antenna system.

FIG. 3 is a view illustrating a channel in a multi-antenna system.

Referring to FIG. 3, channels with respect to $N_T$ number of transmission antennas and a reception antenna I are expressed as $h_{i1}, h_{i2}, \ldots, h_{iNT}$, respectively. For the sake of convenience, these channels may be expressed as a matrix or a vector. The channels may be expressed in the form of vector in Equation 7 below.

$$h_i^T = [h_{i1}, h_{i2}, \ldots, h_{iN_T}] \qquad \text{[Equation 7]}$$

When a matrix form of all the channels from $N_T$ number of transmission antennas to $N_R$ number of reception antennas is a channel matrix H, the channel matrix H may be expressed as Equation 8 below.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R1} & h_{N_R2} & \cdots & h_{N_RN_T} \end{bmatrix} \qquad \text{[Equation 8]}$$

Signals transmitted through the transmission antennas may be received by the reception antennas through the channels expressed in Equation 8. Here, noise is added in the actual channels. Such noise may be considered as Additive White Gaussian Noise (AWGN) mathematically. When AWGN added to the reception antennas is expressed as $n_1, n_2, \ldots, n_{NR}$, the AWGN may be expressed as a vector of Equation 9 below for the sake of convenience.

$$n = [n_1, n_2, \ldots, n_{N_R}]^T \qquad \text{[Equation 9]}$$

In consideration of the foregoing AWGN, the transmission signal vector x, and the channel matrix, a reception signal vector y received by the reception antennas may be expressed as Equation 10 below.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R1} & h_{N_R2} & \cdots & h_{N_RN_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = \qquad \text{[Equation 10]}$$

$$Hx + n$$

In the channel matrix H, the number of rows and the number of columns are determined depending on the number of transmission antennas and the number of reception antennas. In the channel matrix H, the number of columns is equal to the number of transmission antennas. Thus, the channel matrix H may be expressed as an $N_R \times N_T$ matrix.

In general, a rank of a matrix is defined by a smaller one among the number of independent rows and the number of independent columns. Thus, the rank of the matrix cannot be greater than the number of columns or the number of rows, and the rank of the channel matrix H may be determined as Equation 11 below.

$$\text{rank}(H) \leq \min(N_T, N_R) \quad \text{[Equation 11]}$$

Meanwhile, a wireless communication system may be divided into a Frequency Division Duplex (FDD) method and a Time Division Duplex (TDD) method. Based on the FDD method, an uplink transmission and a downlink transmission are progressed in different frequency bands. Based on the TDD method, the uplink transmission and the downlink transmission are performed in the same frequency band at different times. A channel response of a TDD method is actually reciprocal. This means the downlink channel response and the uplink channel response are almost same in the current frequency domain. Therefore, there is an advantage in that the downlink channel response in the wireless communication system based on the TDD may be obtained from the uplink channel response. In the TDD method, as the whole frequency domain is divided into an uplink transmission and a downlink transmission by time-share, it is not available to perform the downlink transmission by a terminal and the uplink transmission by a UE at the same time. In the TDD system in which an uplink transmission and a downlink transmission are divided by a subframe unit, the uplink transmission and the downlink transmission are performed in different subframes.

Hereinafter, the LTE system is described in further detail.

Figure 4:
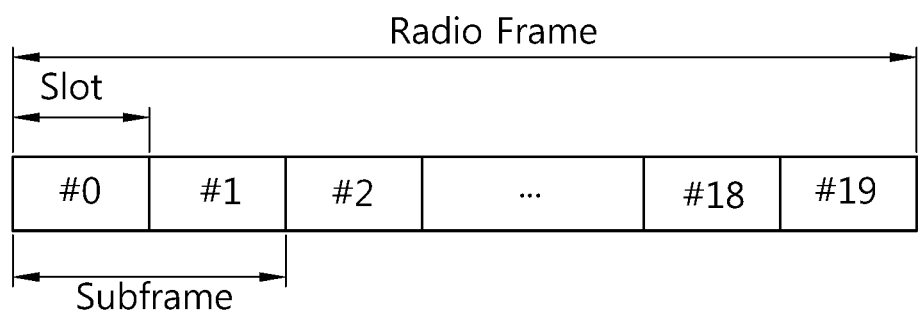
FIG. 4 is a view illustrating a structure of a radio frame according to FDD in a 3GPP LTE.

FIG. 4 illustrates the architecture of a radio frame according to FDD in 3GPP LTE.

Referring to FIG. 4, the radio frame is composed of ten subframes, and one subframe is composed of two slots. The slots in the radio frame are designated by slot numbers from 0 to 19. The time at which one subframe is transmitted is referred to as a Transmission Time Interval (TTI). The TTI may be called as a scheduling unit for data transmission. For example, the length of one radio frame may be 10 ms, the length of one subframe may be 1 ms, and the length of one slot may be 0.5 ms.

The structure of the radio frame is merely an example, and the number of subframes included in the radio frame, the number of slots included in the subframe, etc. may be variously modified.

Figure 5:
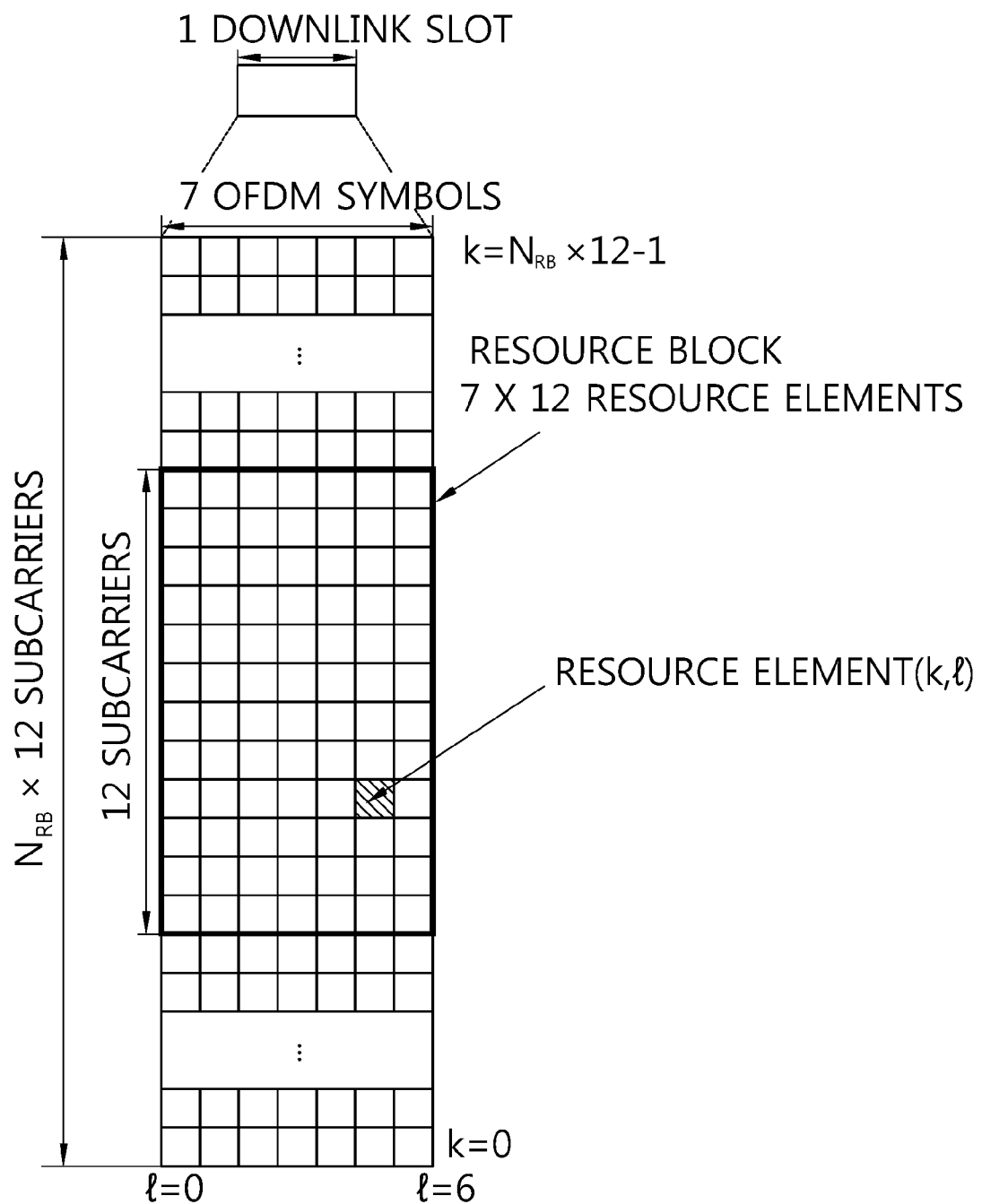
FIG. 5 is a view illustrating a resource grid regarding a single uplink or downlink slot in the 3GPP LTE.

FIG. 5 illustrates an example resource grid for one uplink or downlink slot in 3GPP LTE.

Referring to FIG. 5, the uplink slot includes a plurality of Orthogonal Frequency Division Multiplexing (OFDM) symbols in the time domain and NUL Resource Blocks (RBs) in the frequency domain. OFDM symbol is to represent one symbol period, and depending on system, may also be denoted SC-FDMA symbol, OFDM symbol, or symbol period. The resource block is a unit of resource allocation and includes a plurality of sub-carriers in the frequency domain. The number of resource blocks included in the uplink slot, i.e., NUL, is dependent upon an uplink transmission bandwidth set in a cell. Each element on the resource grid is denoted resource element.

Here, by way of example, one resource block includes 7×12 resource elements that consist of seven OFDM symbols in the time domain and 12 sub-carriers in the frequency domain. However, the number of sub-carriers in the resource block and the number of OFDM symbols are not limited thereto. The number of OFDM symbols in the resource block or the number of sub-carriers may be changed variously. In other words, the number of OFDM symbols may be varied depending on the above-described length of CP. In particular, 3GPP LTE defines one slot as having seven OFDM symbols in the case of CP and six OFDM symbols in the case of extended CP.

In 3GPP LTE, the resource grid for one uplink slot shown in FIG. 4 may also apply to the resource grid for the downlink slot.

Figure 6:
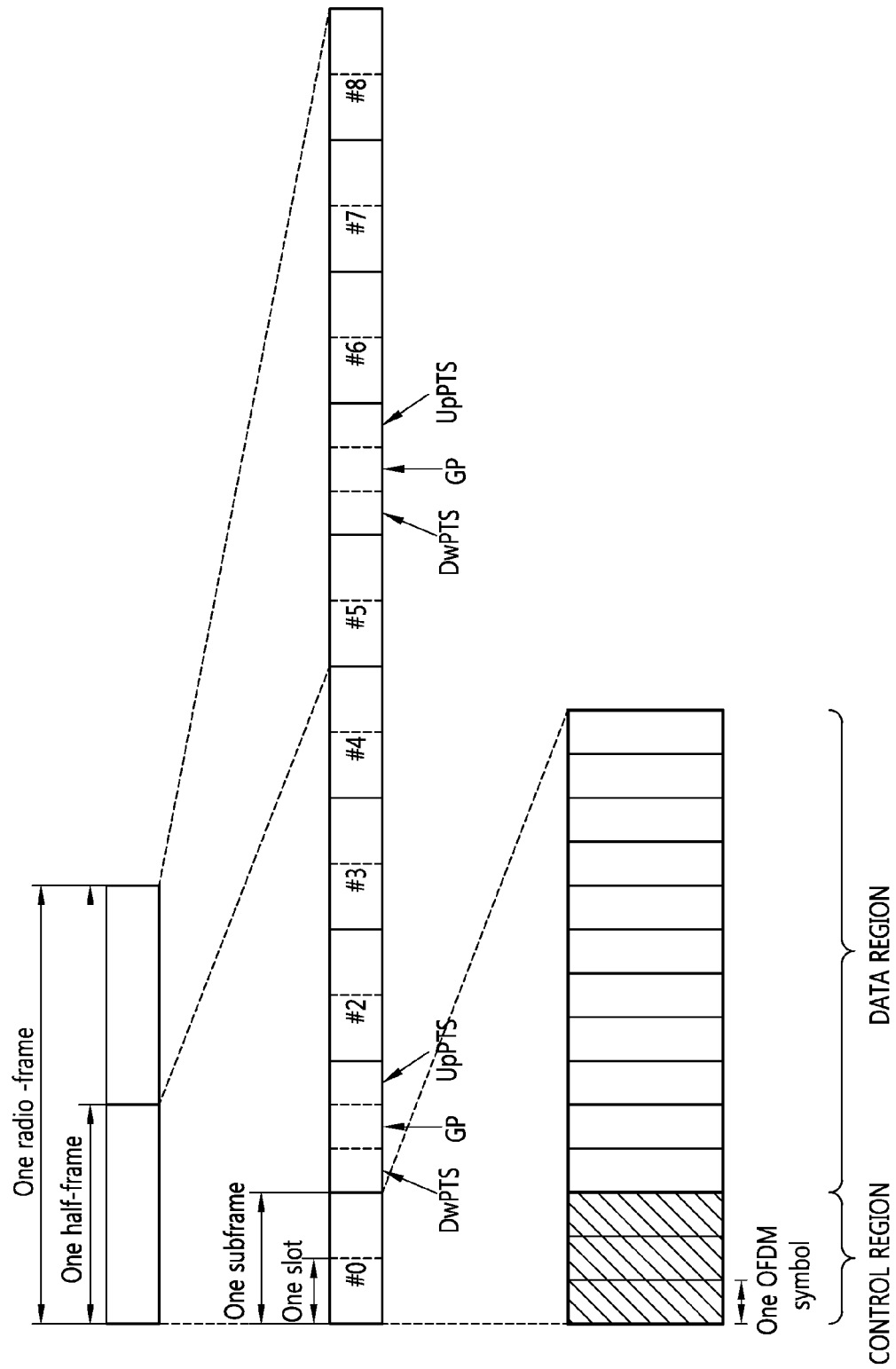
FIG. 6 is a view illustrating a structure of a downlink subframe.

FIG. 6 illustrates the architecture of a downlink sub-frame.

For this, 3GPP TS 36.211 V10.4.0 (2011-12) "Evolved Universal Terrestrial Radio Access (E-UTRA); Physical Channels and Modulation (Release 10)", Ch. 4 may be referenced.

The radio frame includes 10 sub-frames indexed 0 to 9. One sub-frame includes two consecutive slots. Accordingly, the radio frame includes 20 slots. The time taken for one sub-frame to be transmitted is denoted Transmission Time Interval (TTI). For example, the length of one sub-frame may be 1 ms, and the length of one slot may be 0.5 ms.

One slot may include a plurality of orthogonal frequency division multiplexing (OFDM) symbols in the time domain. OFDM symbol is merely to represent one symbol period in the time domain since 3GPP LTE adopts Orthogonal Frequency Division Multiple Access (OFDMA) for DownLink (DL), and the multiple access scheme or name is not limited thereto. For example, the OFDM symbol may be referred to as single carrier-frequency division multiple access (SC-FDMA) symbol or symbol period.

Here, one slot includes seven OFDM symbols, by way of example. However, the number of OFDM symbols included in one slot may vary depending on the length of cyclic prefix (CP). That is, as described above, according to 3GPP TS 36.211 V10.4.0, one slot includes seven OFDM symbols in the normal CP and six OFDM symbols in the extended CP.

Resource Block (RB) is a unit for resource allocation and includes a plurality of sub-carriers in one slot. For example, if one slot includes seven OFDM symbols in the time domain and the resource block includes 12 sub-carriers in the frequency domain, one resource block may include 7×12 Resource Elements (REs).

The DownLink (DL) sub-frame is split into a control region and a data region in the time domain. The control region includes up to first three OFDM symbols in the first slot of the sub-frame. However, the number of OFDM symbols included in the control region may be changed. A Physical Downlink Control CHannel (PDCCH) and other control channels are assigned to the control region, and a PDSCH is assigned to the data region.

As set forth in 3GPP TS 36.211 V10.4.0, the physical channels in 3GPP LTE may be classified into data channels such as Physical Downlink Shared CHannel (PDSCH) and Physical Uplink Shared CHannel (PUSCH) and control channels such as Physical Downlink Control CHannel (PDCCH), Physical Control Format Indicator CHannel (PCFICH), Physical Hybrid-ARQ Indicator CHannel (PHICH) and Physical Uplink Control CHannel (PUCCH).

The PCFICH transmitted in the first OFDM symbol of the sub-frame carries Control Format Indicator (CIF) regarding the number (i.e., size of the control region) of OFDM symbols used for transmission of control channels in the sub-frame. The wireless device first receives the CIF on the PCFICH and then monitors the PDCCH.

Unlike the PDCCH, the PCFICH is transmitted through a fixed PCFICH resource in the sub-frame without using blind decoding.

The PHICH carries a positive-acknowledgement (ACK)/negative-acknowledgement (NACK) signal for a UL Hybrid Automatic Repeat Request (HARQ). The ACK/NACK signal for UpLink (UL) data on the PUSCH transmitted by the wireless device is sent on the PHICH.

The Physical Broadcast CHannel (PBCH) is transmitted in the first four OFDM symbols in the second slot of the first sub-frame of the radio frame. The PBCH carries system information necessary for the wireless device to communicate with the base station, and the system information transmitted through the PBCH is denoted Master Information Block (MIB). In comparison, system information transmitted on the PDSCH indicated by the PDCCH is denoted system information block (SIB).

The control information transmitted through the PDCCH is denoted Downlink Control Information (DCI). The DCI may include resource allocation of PDSCH (this is also referred to as DownLink (DL) grant), resource allocation of PUSCH (this is also referred to as UpLink (UL) grant), a set of transmission power control commands for individual UEs in some UE group, and/or activation of Voice over Internet Protocol (VoIP).

In 3GPP LTE, blind decoding is used for detecting a PDCCH. The blind decoding is a scheme of identifying whether a PDCCH is its own control channel by demasking a desired identifier to the Cyclic Redundancy Check (CRC) of a received PDCCH (this is referred to as candidate PDCCH) and checking a CRC error. The base station determines a PDCCH format according to the DCI to be sent to the wireless device, then adds a CRC to the DCI, and masks a unique identifier (this is referred to as Radio Network Temporary Identifier (RNTI) to the CRC depending on the owner or purpose of the PDCCH.

According to 3GPP TS 36.211 V10.4.0, the uplink channels include a PUSCH, a PUCCH, a Sounding Reference Signal (SRS), and a Physical Random Access CHannel (PRACH).

Figure 7:
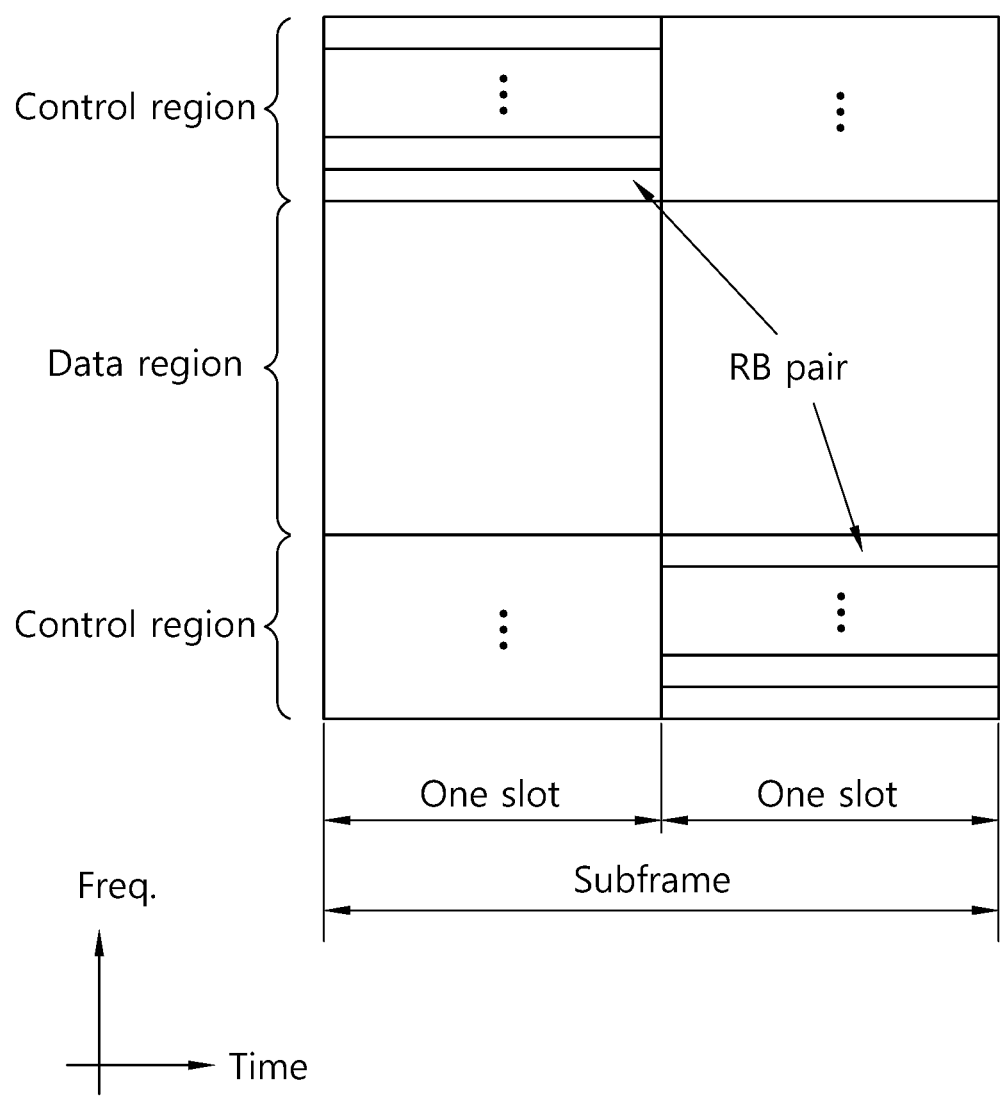
FIG. 7 is a view illustrating a structure of an uplink subframe in the 3GPP LTE.

FIG. 7 illustrates the architecture of an uplink sub-frame in 3GPP LTE.

Referring to FIG. 7, the uplink sub-frame may be separated into a control region and a data region in the frequency domain. The control region is assigned a Physical Uplink Control CHannel (PUCCH) for transmission of uplink control information. The data region is assigned a PUSCH (physical uplink shared channel) for transmission of data (in some cases, control information may also be transmitted).

The PUCCH for one terminal is assigned in Resource Block (RB) pair in the sub-frame. The resource blocks in the resource block pair take up different sub-carriers in each of the first and second slots. The frequency occupied by the resource blocks in the resource block pair assigned to the PUCCH is varied with respect to a slot boundary. This is referred to as the RB pair assigned to the PUCCH having been frequency-hopped at the slot boundary. The terminal may obtain a frequency diversity gain by transmitting uplink control information through different sub-carriers over time.

Figure 8:
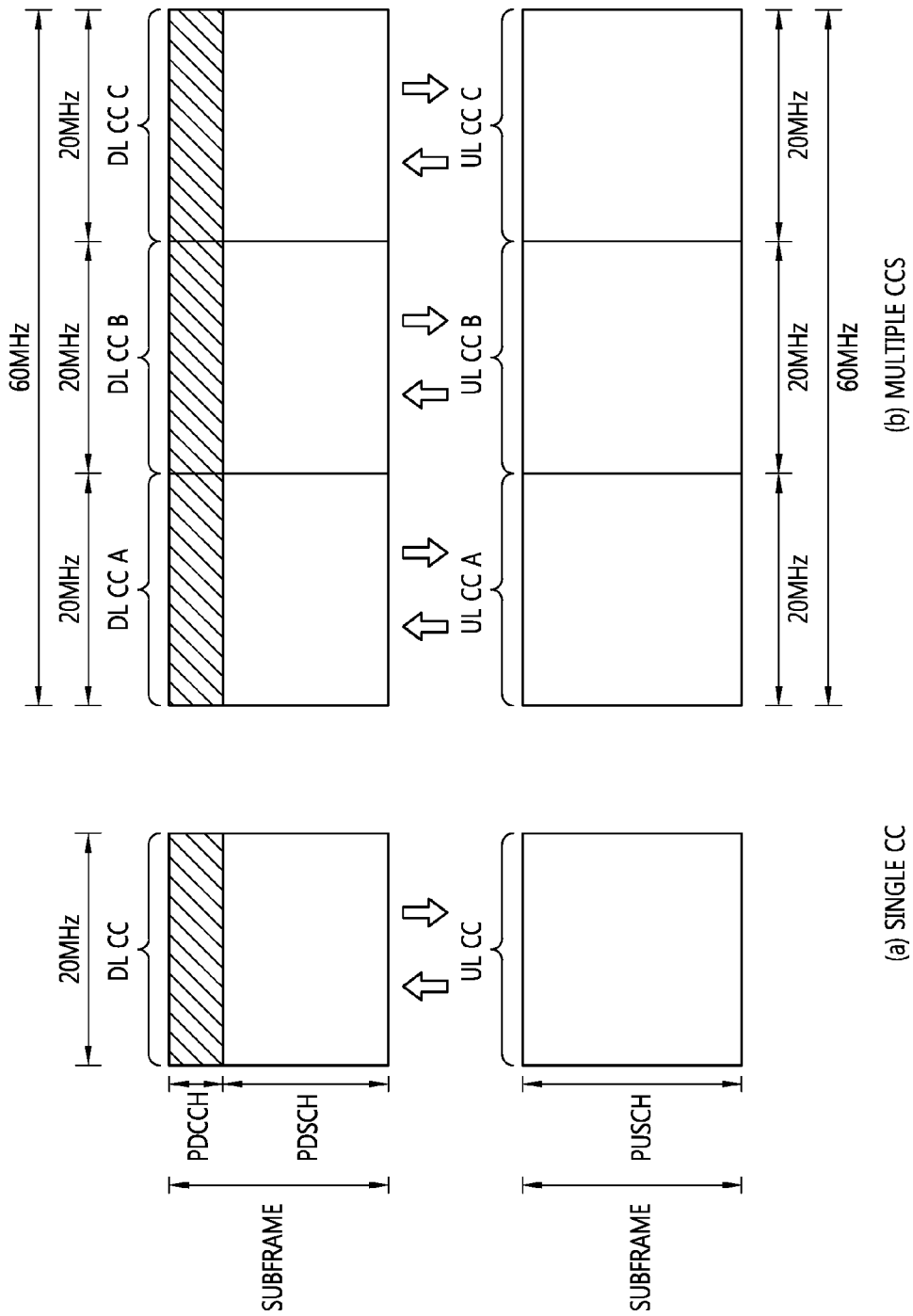
FIG. 8 is a view illustrating an example of comparison between an existing single carrier system and a carrier aggregation system.

FIGS. 8a and 8b illustrate an example of comparison between a single carrier system and a carrier aggregation system.

Referring to FIG. 8a, a typical FDD wireless communication system supports one carrier for uplink and downlink. In this case, the carrier may have various bandwidths, but only one carrier is assigned to the user equipment.

In other words, in the typical FDD wireless communication system, data transmission and reception is carried out through one downlink band and one uplink band corresponding thereto. The bit stream and the user equipment transmit and receive control information and/or data scheduled for each sub-frame. The data is transmitted/received through the data region configured in the uplink/downlink sub-frame, and the control information is transmitted/received through the control region configured in the uplink/downlink sub-frame. For this, the uplink/downlink sub-frame carries signals through various physical channels. Although the description in connection with FIG. 7 primarily focuses on the FDD scheme for ease of description, the foregoing may be applicable to the TDD scheme by separating the radio frame for uplink/downlink in the time domain.

As shown in FIG. 8a, data transmission/reception performed through one downlink band and one uplink band corresponding to the downlink band is referred to as a single carrier system.

Such single carrier system may correspond to an example of communication in the LTE system. Such 3GPP LTE system may have an uplink bandwidth and a downlink bandwidth that differ from each other, but supports up to 20 MHz.

Meanwhile, a high data transmission rate is demanded. The most fundamental and stable solution to this is to increase bandwidth.

However, the frequency resources are presently saturated, and various technologies are partially being in use in a wide range of frequency band. For such reason, as a method for securing a broad bandwidth to satisfy the demand for higher data transmission rate, each scattered band may be designed to meet basic requirements for being able to operate an independent system, and Carrier Aggregation (CA) whose concept is to bundle up multiple bands to a single system has been introduced.

That is, the Carrier Aggregation (CA) system means a system that constitutes a broadband by gathering one or more carriers each of which has a bandwidth narrower than the targeted broadband when supporting a broadband in the wireless communication system.

Such Carrier Aggregation (CA) technology is also adopted in the LTE-advanced (hereinafter, 'LTE-A'). The Carrier Aggregation (CA) system may also be referred to as a multiple-carrier system or bandwidth aggregation system.

In the Carrier Aggregation (CA) system, a user equipment may simultaneously transmit or receive one or more carriers depending on its capabilities. That is, in the Carrier Aggregation (CA) system, a plurality of Component Carriers (CCs) may be assigned to a user equipment. As used herein, the term "component carrier" refers to a carrier used in a carrier aggregation system and may be abbreviated to a carrier. Further, the term "component carrier" may mean a frequency block for carrier aggregation or a center frequency of a frequency block in the context and they may be interchangeably used.

FIG. 8b may correspond to a communication example in an LTE-A system.

Referring to FIG. 8b, in case, e.g., three 20 MHz component carriers are assigned to each of uplink and downlink, the user equipment may be supported with a 60 MHz bandwidth. Or, for example, if five CCs are assigned as granularity of the unit of carrier having a 20 MHz bandwidth, up to 100 MHz may be supported. FIG. 8b illustrates an example in which the bandwidth of an uplink component carrier is the same as the bandwidth of a downlink component carrier for ease of description. However, the bandwidth of each component carrier may be determined independently. When aggregating one or more component carriers, a targeted component carrier may utilize the bandwidth used in the existing system for backward compatibility with the existing system. For example, in a 3GPP LTE system, bandwidths of 1.4 MHz, 3 MHz, 5 MHz, 1 MHz, 10 MHz, 15 MHz and 20 MHz may be supported. Accordingly, the bandwidth of an uplink component carrier may be constituted like 5 MHz(UL CC0)+20 MHz(UL CC1)+20 MHz(UL CC2)+20 MHz(UL CC3)+5 MHz(UL CC4), for example. However, without consideration of backward compatibility, a new bandwidth may be defined rather the existing system bandwidth being used, to constitute a broadband.

FIG. 8b illustrates an example in which the number of uplink component carriers is symmetric with the number of downlink component carriers for ease of description. As such, when the number of uplink component carriers is the same as the number of downlink component carriers is denoted symmetric aggregation, and when the number of uplink component carriers is different from the number of downlink component carriers is denoted asymmetric aggregation.

The asymmetric carrier aggregation may occur due to a restriction on available frequency bands or may be artificially created by a network configuration. As an example, even when the entire system band comprises N CCs, the frequency band where a particular user equipment may perform reception may be limited to M (<N) CCs. Various parameters for carrier aggregation may be configured cell-specifically, UE group-specifically, or UE-specifically.

Meanwhile, carrier aggregation systems may be classified into contiguous carrier aggregation systems where each carrier is contiguous with another and non-contiguous carrier aggregation systems where each carrier is spaced apart from another. A guard band may be present between the carriers in the contiguous carrier aggregation system. Hereinafter, simply referring to a multi-carrier system or carrier aggregation system should be understood as including both when component carriers are contiguous and when component carriers are non-contiguous.

Meanwhile, the concept of cell as conventionally appreciated is varied by the carrier aggregation technology. In other words, according to the carrier aggregation technology, the term "cell" may mean a pair of a downlink frequency resource and an uplink frequency resource. Or, the cell may mean a combination of one downlink frequency resource and an optional uplink frequency resource.

In other words, according to the carrier aggregation technology, one DL CC or a pair of UL CC and DL CC may correspond to one cell. Or, one cell basically includes one DL CC and optionally includes a UL CC. Accordingly, a user equipment communicating with a bit stream through a plurality of DL CCs may be said to receive services from a plurality of serving cells. In this case, although downlink is constituted of a plurality of DL CCs, uplink may be used by only one CC. In such case, the user equipment may be said to receive services from a plurality of serving cells for downlink and to receive a service from only one serving cell for uplink.

Meanwhile, in order for packet data to be transmitted/received through a cell, configuration for a particular cell should be completed. Here, the term "configuration" means the state where system information necessary for data transmission/reception on a corresponding cell is completely received. For example, the configuration may include the overall process of receiving common physical layer parameters necessary for data transmission/reception, Media Access Control (MAC) layer parameters, or parameters necessary for a particular operation in RRC layer. The configuration-completed cell is in the state where packet transmission/reception is possible simply when information indicating that packet data may be transmitted is received.

The configuration-completed cell may be left in activation or deactivation state. Here, the term "activation" refers to data transmission or reception being performed or being ready. The UE may monitor or receive a control channel (PDCCH) or data channel (PDSCH) of an activated cell in order to identify resources (which may be frequency or time) assigned thereto.

Transmission or reception with a deactivated cell is impossible, while measurement or transmission/reception of least information is possible. The user equipment may receive System Information (SI) necessary for receiving packets from a deactivated cell. In contrast, the user equipment does not monitor or receive the control channel (PDCCH) and data channel (PDSCH) of deactivated cells to identify resources (which may be frequency or time) assigned thereto.

In accordance with carrier aggregation technology, thus, activation/deactivation of a component carrier may be the same in concept as activation/deactivation of a serving cell. For example, assuming that serving cell 1 comprises DL CC1, activation of serving cell 1 means activation of DL CC1. Assuming that serving cell 2 is configured so that DL CC2 is connected with UL CC2, activation of serving cell 2 means activation of DL CC2 and UL CC2. In that regard, each component carrier may correspond to a serving cell.

On the other hand, a change in the concept of serving cell as conventionally understood by the carrier aggregation technology leads to primary cells and secondary cells being separated from each other.

The primary cell refers to a cell operating in a primary frequency and means a cell where the user equipment performs an initial connection establishment procedure or connection re-establishment procedure with a bit stream or a cell designated so during the course of handover.

The secondary cell means a cell operating in a secondary frequency, and is configured once an RRC connection is established and is used to provide additional radio resources.

The Primary Component Carrier (PCC) means a Component Carrier (CC) corresponding to the primary cell. The PCC means a CC where the user equipment initially achieves connection (or RRC connection) with the base station among various CCs. The PCC is a special CC that is in charge of connection (or RRC connection) for signaling regarding multiple CCs and that manages UE context that is connection information relating to the UE. Further, the PCC, in case the PCC achieves connection with the UE so that it is in RRC connected mode, always remains in activated state. The downlink component carrier corresponding to the primary cell is referred to as a DownLink Primary Component Carrier (DL PCC), and the uplink component carrier corresponding to the primary cell is referred to as an UpLink Primary Component Carrier (UL PCC).

The Secondary Component Carrier (SCC) means a CC corresponding to the secondary cell. That is, the SCC is a CC assigned to the user equipment, which is not the PCC, and the SCC is an extended carrier for the user equipment to assign additional resources other than the PCC. The SCC may stay in activated state or deactivated state. The downlink component carrier corresponding to the secondary cell is referred to as a DownLink Secondary Component Carrier (DL SCC), and the uplink component carrier corresponding to the secondary cell is referred to as an UpLink Secondary Component carrier (UL SCC).

The primary cell and the secondary cell have the following features.

First, the primary cell is used for transmission of a PUCCH. Second, the primary cell always remain activated while the secondary cell switches between activation/deactivation depending on particular conditions. Third, when the primary cell experiences Radio Link Failure (hereinafter, "RLF"), the RRC reconnection is triggered. Fourth, the primary cell may be varied by a handover procedure that comes together with security key changing or a Random Access CHannel (RACH) procedure. Fifth, Non-Access Stratum (NAS) information is received through the primary cell. Sixth, in the case of an FDD system, the primary cell is constituted of a pair of DL PCC and UL PCC. Seventh, a different component carrier may be set as the primary cell for each user equipment. Eighth, primary cells may be exchanged only by a handover, cell selection/cell reselection process. In adding a new secondary cell, RRC signaling may be used to transmit system information of the dedicated secondary cell.

As described above, the carrier aggregation system may support a plurality of Component Carriers (CCs), i.e., a plurality of serving cells, unlike the single carrier system.

Such carrier aggregation system may support cross-carrier scheduling. The cross-carrier scheduling is a scheduling method that allows for resource allocation of a PDSCH transmitted through other component carrier through a PDCCH transmitted through a particular component carrier and/or resource allocation of a PUSCH transmitted through other component carrier than the component carrier basically linked with the particular component carrier. That is, a PDCCH and a PDSCH may be transmitted through different downlink CCs, and a PUSCH may be transmitted through an uplink CC other than an uplink CC linked with a downlink CC through which a PDCCH including a UL grant is transmitted. As such, the cross-carrier scheduling-supportive system requires a carrier indicator indicating a DL CC/UL CC through which a PDSCH/PUSCH through which a PDCCH provides control information is transmitted. The field containing such carrier indicator is hereinafter referred to as a Carrier Indication Field (CIF).

The carrier aggregation system supportive of cross-carrier scheduling may include a Carrier Indication Field (CIF) in the conventional Downlink Control Information (DCI) format. A cross-carrier scheduling-supportive system, e.g., an LTE-A system, adds a CIF to the existing DCI format (i.e., DCI format used in LTE), so that it may be extended with three bits, and it may reuse the existing coding scheme, resource allocation scheme (i.e., CCE-based resource mapping) for the PDCCH structure.

Hereinafter, a reference signal will be described.

In general, transmission information, for example, data, is easily distorted or changed while being transmitted through a wireless channel. Thus, in order to demodulate such transmission information without an error, a reference signal is required. The reference signal, a signal known in advance between a transmitter and a receiver, is transmitted together with the transmission information. The transmission information transmitted from the transmitter undergoes a channel corresponding to each transmission antennas or each layer, and thus, the reference signal may be allocated for each transmission antenna or each layer. The reference signal for each transmission antenna or each layer may be discriminated by using resource such as a time, a frequency, or a code. The reference signal may be used for two purposes, that is, demodulation of transmission information and channel estimation.

Reference signals may be divided into two types of reference signals depending on a range of a receiver which already knows about the reference signals. A first type of reference signal is a reference signal that only a specific receiver (for example, a specific terminal) knows, and such a reference signal is called a Dedicated Reference Signal (DRS). In this context, the DRS is also called a UE-specific RS. A second type of reference signal is a reference signal that every receiver, for example, every UE, knows, and such a reference signal is called a Common Reference Signal (CRS). The CRS is also called a cell-specific RS.

Reference signals may also be classified according to purposes. For example, a reference signal used for demodulating data is called a DeModulation Reference Signal (DM-RS). A reference signal used for feedback information indicating a channel state such as CQI/PMI/RI is called a Channel State Indicator-Reference Signal (CSI-RS). The foregoing DRS may be used as a DM-RS. Hereinafter, it is assumed that the DM-RS is a DRS.

Figure 9A:
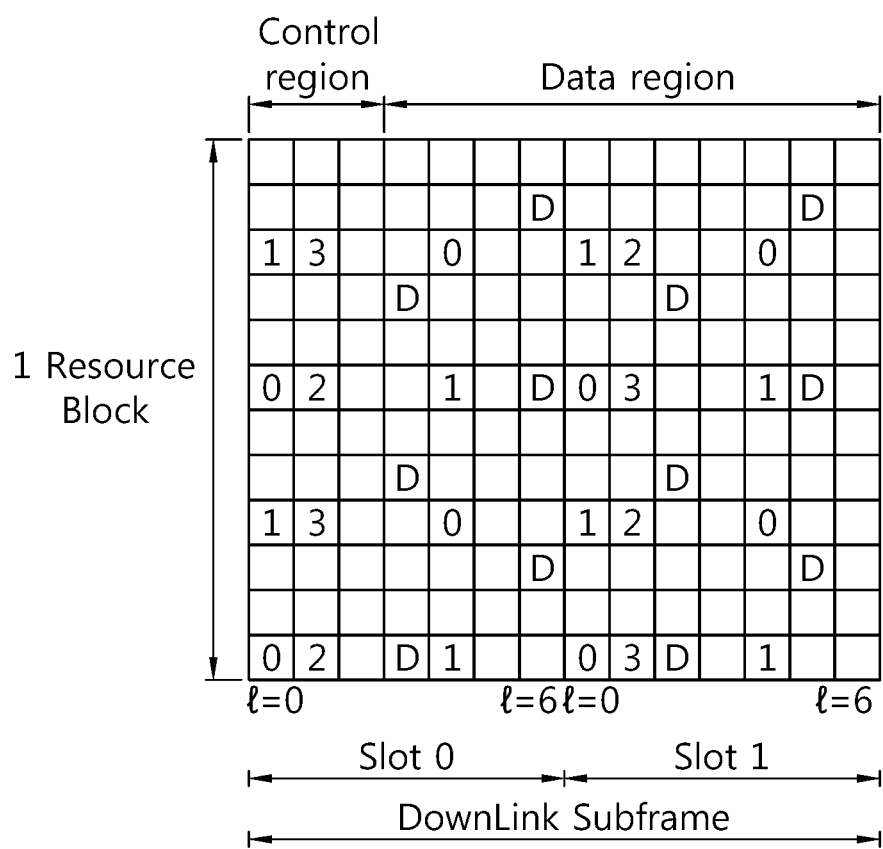
FIG. 9A is a view illustrating an example of an RS structure supporting four antenna ports in a normal CP.
Figure 9B:
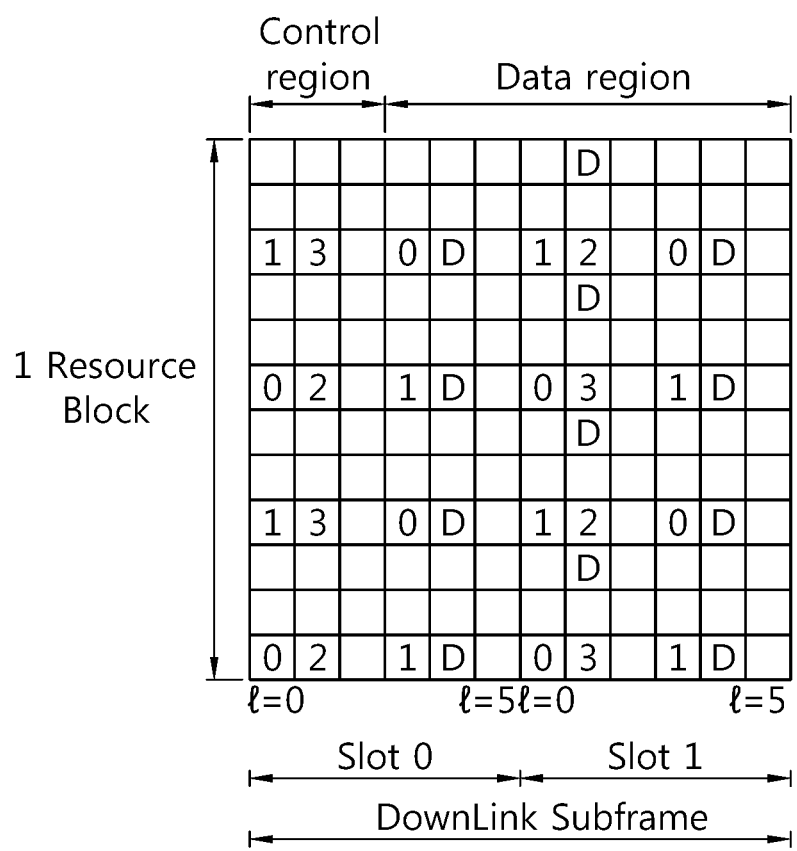
FIG. 9B is a view illustrating an example of an RS structure supporting four antenna ports in an extended CP.

FIG. 9A is a view illustrating an example of an RS structure capable of supporting four antenna ports in a normal CP. FIG. 9B is a view illustrating an example of an RS structure capable of supporting four antenna ports in an extended CP.

The RS structures of FIGS. 9A and 9B are those used in the related art 3GPP LTE system.

In FIGS. 9A and 9B, resource elements in which any one of numbers from 0 to 3 are expressed indicate resource elements in which a cell-specific reference signal, i.e., a CRS, is transmitted. Here, any one of the numbers from 0 to 3 indicate a supported antenna port. That is, resource elements indicated by p (p is any one of 0 to 3) refer to resource elements to which a CRS with respect to an antenna port p is mapped. Such a CRS is used to perform channel measurement and data demodulation with respect to each antenna port. The CRS is transmitted in both a control region and a data region of a subframe.

In FIGS. 9A and 9B, resource elements indicated by 'D' denote resource elements to which a UE-specific reference signal, i.e., a DRS, is mapped. The UE-specific RS may be used for transmission of a single antenna port of a PDSCH. A UE is instructed as to whether a UE-specific RS is transmitted through a higher layer signal, or as to whether a UE-specific RS is valid when a PDSCH is transmitted. The UE-specific RS may be transmitted only when data demodulation is required. The UE-specific RS may be transmitted only in a data region of a subframe.

Figure 10:
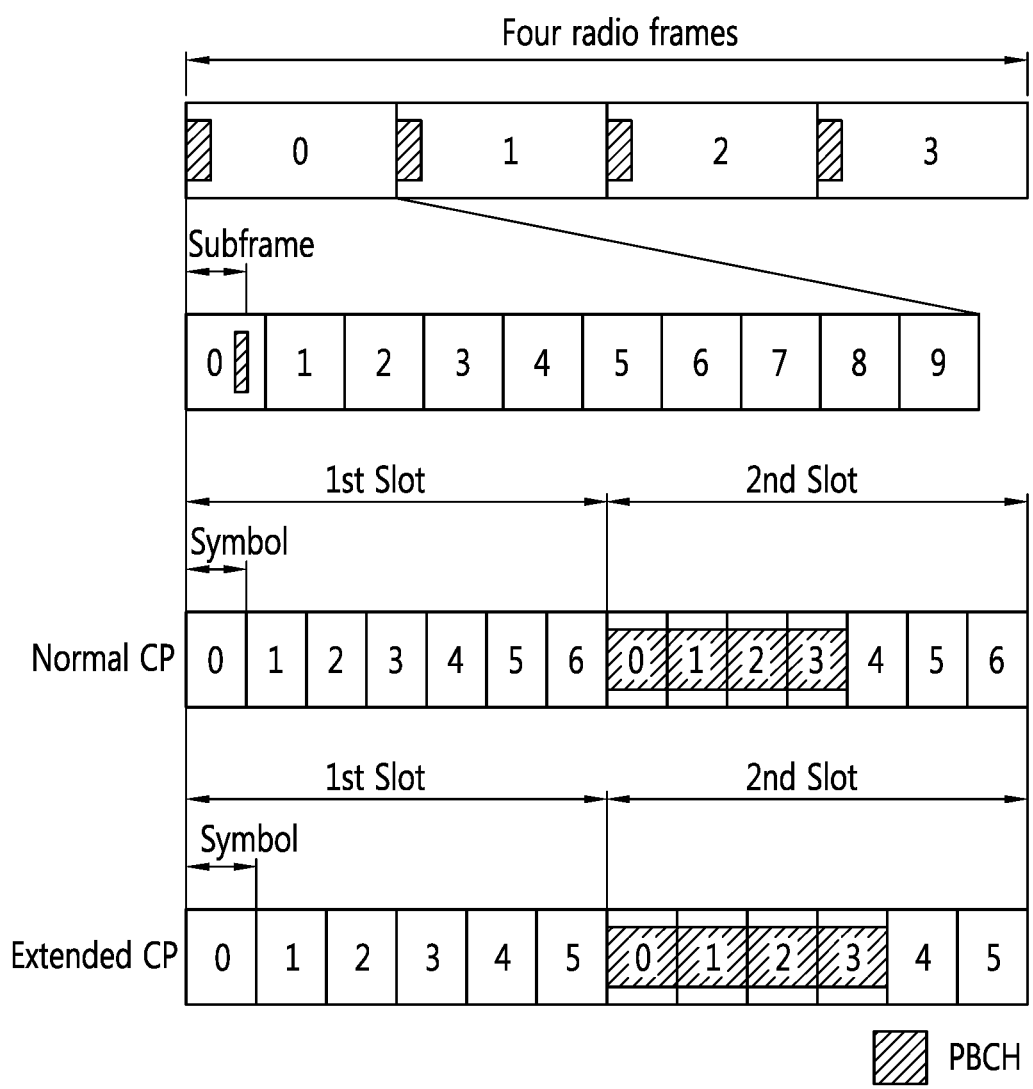
FIG. 10 is a view illustrating a frame structure for a physical broadcast channel (PBCH).

FIG. 10 is a view illustrating a frame structure for a Physical Broadcast Channel (PBCH).

As illustrated, a radio frame, subframe, and symbol numbers start from 0. A PBCH is transmitted in every radio frame, that is, in every 10 ms.

Also, as illustrated, the PBCH is transmitted on #0 subframe of each radio frame. In detail, the PBCH is transmitted on 0, 1, 2, and 3 symbols of the second slot.

The PBCH is used for each BS to transmit Master Information Block (MIB) most important for an operation of a system, and such MIB information is retransmitted at every period of 10 ms with a very low coding rate four times such that all the terminals connected to the corresponding cell reliably receive the information, thus allowing for reception of the MIB information even in a considerably poor channel environment.

Meanwhile, MIB information having a total of 24 bits is defined in TS36.331 of the current LTE standard as follows.

TABLE 1

```
-- ASN1START
MasterInformationBlock ::=    SEQUENCE {
    dl-Bandwidth                        ENUMERATED {
                                            n6, n15, n25, n50,
n75, n100},
    phich-Config                        PHICH-Config,
    systemFrameNumber                   BIT STRING (SIZE (8)),
    spare                               BIT STRING (SIZE (10))
}
-- ASN1STOP
```

As for the MIB information, when transmitted each time, in general, the same determined data is transmitted in each cell, excluding a systemFrameNumber field, and when a System Information Block (SIB) including the MIB needs to be changed for some reasons, it is informed to every UE within a cell through paging RRC signaling. Thus, PBCH reception by a UE is required only once in an initial cell detection, and afterwards, existing information is maintained until Radio Resource Control (RRC) signaling indicating that PBCH information of a serving cell has been updated is received, and an additional receiving process is not required.

Recently, a heterogeneous network in which a macro cell and a small cell coexist is under discussion. In particular, discussions for bypassing traffic by distributing a UE connected to a macro cell to a small cell are in progress.

Figure 11:
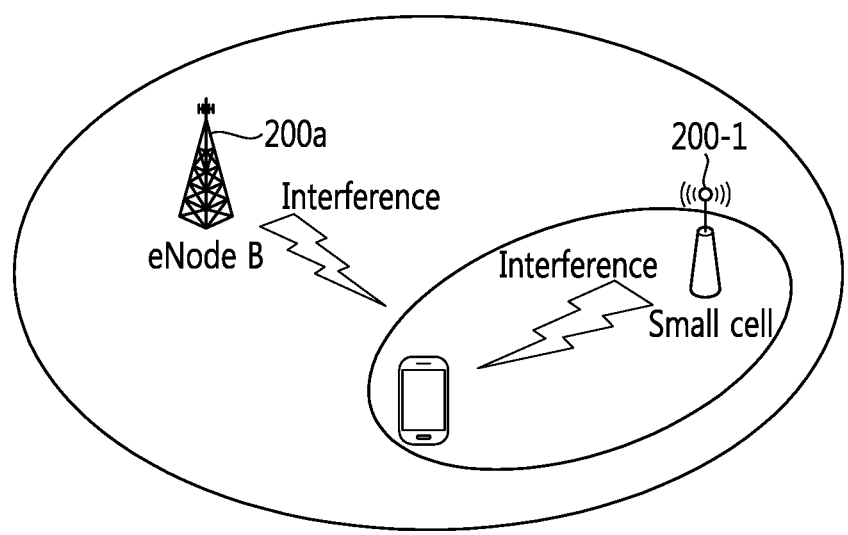
FIG. 11 is a view illustrating a heterogeneous network including a macro cell and a small cell.

FIG. 11 is a view illustrating a heterogeneous network including a macro cell and a small cell.

In a next-generation communication standard including a 3GPP LTE-A, a heterogeneous in which a small cell, for example, a pico cell, a femto cell, or a micro cell having low transmission power exist in an overlapping manner in existing macro cell coverage is under discussion.

Referring to FIG. 11, a macro cell may overlap one or more micro cells. A service of the macro cell is provided by a Macro eNodeB (MeNB). In this disclosure, a macro cell and an MeNB may be mixedly used. A UE connected to the macro cell may be designated as a macro UE. The macro UE receives a downlink signal from the MeNB and transmits an uplink signal to the MeNB.

The small cell may also be designated as a femto cell, a pico cell, or a micro cell. A service of the small cell is provided by a pico eNodeB, a Home eNodeB (HeNB), or a Relay Node (RN). For the purposes of description, the pico eNodeB, the HeNB, and the RN will be generally referred to as a Home BS (HeNB). In this disclosure, a micro cell and the HeNB may be mixedly used.

In the heterogeneous network, since the macro cell and the small cell overlap, inter-cell interference may be problematic. As illustrated, when a UE is located in a boundary between the macro cell and the small cell, a downlink signal from the macro cell may act as interference. Similarly, a downlink signal from the small cell may also act as interference.

For a specific example, when a UE 100 connected to a small cell 200-1 is located in the boundary of the small cell, the UE 100 may be disconnected from the small cell 200-1 due to interference from the macro cell 200, and this means that coverage of the small cell 200-1 is smaller than expected.

In another example, when the UE 100 connected to the macro cell 200 is in the region of the small cell 200-1, the UE 100 may be disconnected from the macro cell 200 due to interference from the small cell 200-1. This means that a shadow area is generated within the macro cell 200.

The most fundamental method for solving the interference problem is using different frequencies between heterogeneous networks. However, since a frequency is scarce and expensive resource, and thus, the solution based on frequency division is not welcomed to mobile carriers.

Thus, in 3GPP, such inter-cell interference is solved through time division.

Thus, recently, in 3GPP, eICIC (enhanced Inter-Cell Interference Coordination) has been actively researched as an interference cooperation method.

The time division scheme introduced to LTE Release-10 is called an enhanced ICIC (Enhanced inter-cell interference Coordination) in that it has been advanced compared with the existing frequency division scheme. According to the time division scheme, a cell causing interference is defined as an aggressor cell or a primary cell, an interfered cell is defined a victim cell or a secondary cell, and the aggressor cell or the primary cell stops data transmission in a specific subframe so that a UE may maintain connection with the victim cell or the secondary cell in the corresponding subframe. That is, in this method, when heterogeneous cells coexist, either cell temporarily stops signal transmission for a UE considerably interfered in a certain region and rarely transmits an interference signal.

A specific subframe in which the data transmission is stopped is called an Almost Blank Subframe (ABS), and any data other than essential control information is not transmitted in the subframe corresponding to the ABS. The essential control information may be, for example, a Cell-specific Reference Signal (CRS). In the current 3GPP LTE/LTE-A standard, the CRS signal exists in $0^{th}$, $4^{th}$, $7^{th}$, and $11^{th}$ OFDM symbols in a time axis. Thus, in the subframe as the ABS, only the CRS signal is transmitted on the $0^{th}$, $4^{th}$, $7^{th}$, and $11^{th}$ OFDM symbols.

Figure 12A:
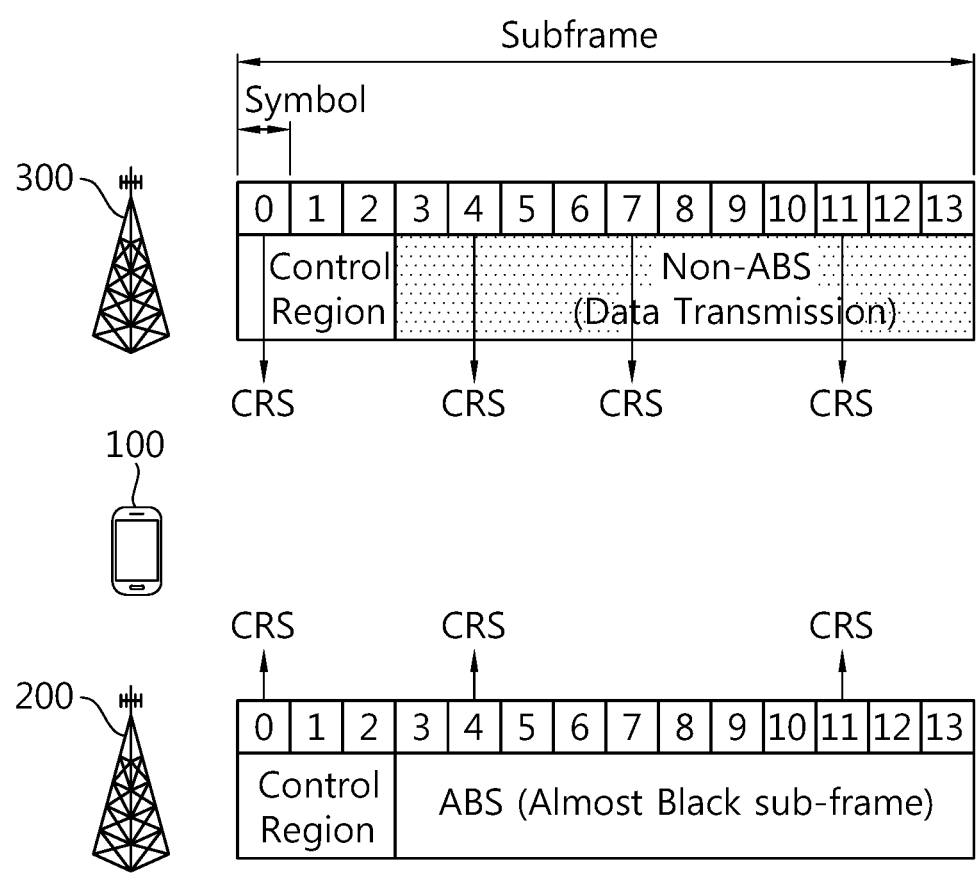
FIG. 12A is a view illustrating eICIC (enhanced Inter-Cell Interference Coordination) for solving interference between base stations.

FIG. 12A is a view illustrating eICIC (enhanced Inter-Cell Interference Coordination) for solving interference between base stations.

Referring to FIG. 12A, a first eNodeB 200a performs data transmission in a data region of an illustrated subframe, and CRSs are transmitted on $0^{th}$, $4^{th}$, $7^{th}$, and $11^{th}$ symbols.

Here, the second eNodeB 200b operates the illustrated subframe as an ABS.

That is, when the eICIC is applied to the second eNodeB 200b, a corresponding subframe is operated as an ABS and no data may be transmitted in the data region. However, in the subframe operated as an ABS, only CRS may be transmitted on the $0^{th}$, $4^{th}$, $7^{th}$, and $11^{th}$ symbols.

FIG. 12B is a view illustrating an example of exchanging ABS subframe-related information.

As can be seen with reference to FIG. 12B, ABS-related information may be exchanged between the first eNodeB 200a and the second eNodeB 200b through an X2 interface.

Also, the first eNodeB 200a and the second eNodeB 200b may transmit the ABS-related information to the serving UEs 100a and 100b thereof, respectively.

The first eNodeB 200a and the second eNodeB 200b may set a measurement subset for the serving UEs 100a and 100b thereof on the basis of one or more of the ABS-related information of their own and ABS-related information of a counterpart, and transmit the same.

Since the corresponding cell 200a or 200b does not transmit a downlink signal or transmit a downlink signal with reduced power on the downlink subframe set as an ABS, a magnitude of interference affecting coverage of other cell may be reduced, compared with a downlink subframe which is not set as an ABS. Thus, since a magnitude of interference may vary depending on whether a corresponding subframe has been set as an ABS, the UE 100 may perform measurement only on a previously designated specific subframe.

To this end, on the basis of one or more of the ABS pattern information of their own and ABS pattern information of a counterpart, each of the cells 200a and 200b may instruct the serving UEs 100a and 100b thereof to perform measurement only on a specific subframe. This is called a restricted measurement. The instruction may be transmitted through higher layer signaling. The higher layer signaling may be RRC signaling. The signaling may be a CQI-ReportConfig element.

The ABS-related information includes ABS information and an ABS state.

First, the ABS information may include one or more of information elements shown in Table 2 below. ABS pattern information is information indicating a subframe to be used as an ABS, as a bitmap, and may be configured as a 40-bit bitmap in FDD and a maximum of 70-bit bitmap in case of TDD. For example, in case of FDD, 40 bits represent 40 subframes, and when a bit value is 1, it represents an ABS, and when the bit value is 0, it represents a general subframe (non-ABS), rather than an ABS. A measurement subset is a subset of ABS pattern information and is also configured as a 40-bit bitmap in FDD and a maximum of 70-bit bitmap in TDD. Such a measurement subset is to set a restricted measurement in a corresponding UE.

TABLE 2

| Information element | Description |
| --- | --- |
| ABS Pattern Information | In each position of a bitmap, a value "1" indicates an ABS and a value "0" indicates a non-ABS. A first position of an ABS Pattern corresponds to a subframe 0 in a radio frame of SFN = 0. The ABS pattern continuously appears in every radio frame. A maximum number of subframes is 40. |
| Measurement subset | It indicates a subset of ABS pattern information and is used to set UE-specific measurement. |
| ABS deactive | It indicates that interference coordination by ABS is not activated. |

An ABS status is used to determine whether a corresponding cell should change an ABS pattern. Available ABS pattern information is a subset of ABS pattern information, which also includes a bitmap. The available ABS pattern information indicates whether a subframe designated as an ASB has been properly used for the purpose of alleviating interference. A downlink ABS status, a ratio of the number of downlink Resource Blocks (RBs) scheduled in a subframe indicated in the available ABS pattern information and Resource Blocks (RBs) allocated for a UE to be protected through the ABS among the scheduled downlink resource blocks, represents information as to how effectively the ABS has been utilized for an intrinsic purpose in a victim cell.

TABLE 3

| Information element | Description |
| --- | --- |
| DL ABS status | It is a percentage of used ABS resources. The numerator of the percentage includes resource blocks in an ABS indicated in available ABS pattern information, and the denominator is a total number of resource blocks of ABS indicated in the available ABS pattern information. |

TABLE 3-continued

| Information element | Description |
| --- | --- |
| Availability of ABS pattern information | Each position in a bitmap indicates a subframe, and a value "1" indicates an ABS designated to be protected by inter-cell interference, and a value "0" is used for all of the other subframes. A pattern expressed by a bitmap is configured as a subset of corresponding ABS pattern information or configured to be the same. |

The measurement subset configured as a subset of the ABS pattern information is a subframe used as an ABS, and other subframes included in the ABS pattern may determine as to whether a corresponding cell is to be autonomously utilized as an ABS according to a traffic load.

In addition to the solution of the inter-cell interference problem through the eICIC technique, a scheme of adding an interference cancellation capability to the UE 100.

When the interference cancellation capability is used, an inter-cell interference may be reduced, and thus, coverage of a small cell can be expanded. Details thereof will be described with reference to FIG. 13.

Figure 13:
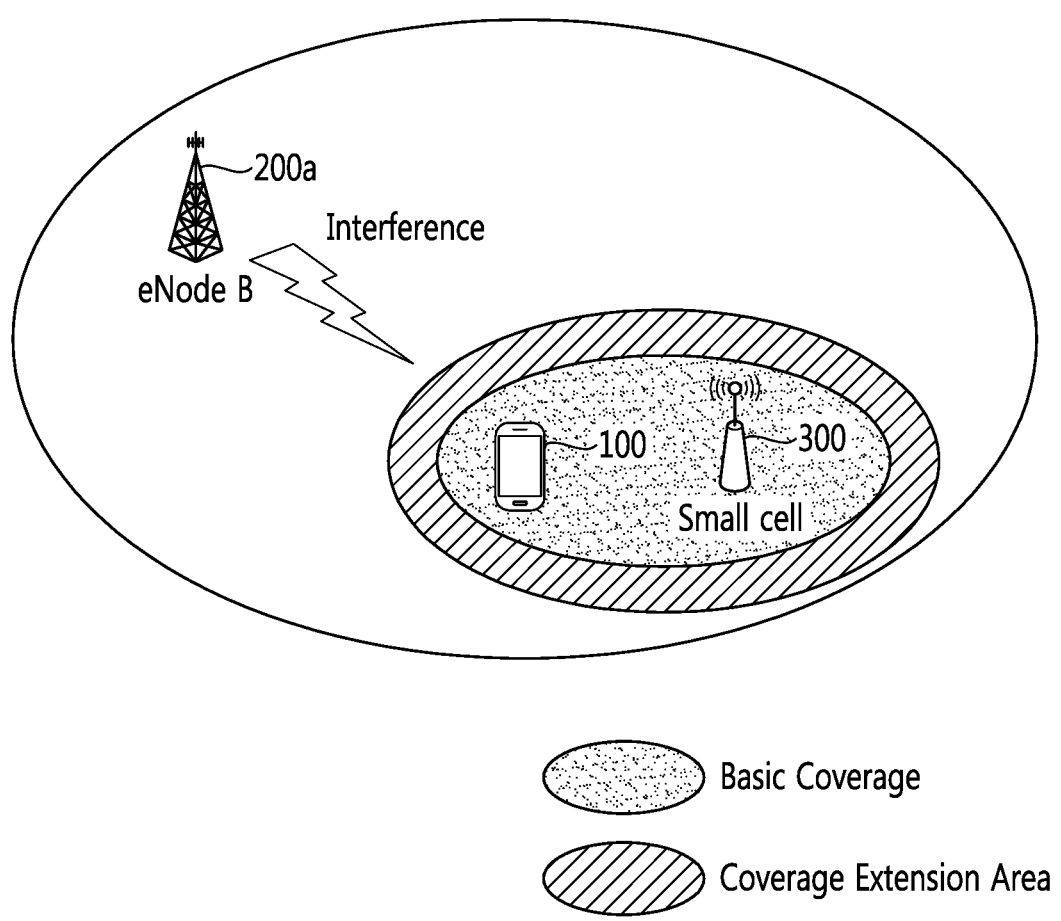
FIG. 13 is a view illustrating a concept of expanding coverage of a small cell according to an embodiment of the present disclosure.

FIG. 13 is a view illustrating a concept of expanding coverage of a small cell according to an embodiment of the present disclosure.

As illustrated in FIG. 13, a base station (e.g., a pico eNodeB) 300 of several small cells may be installed in coverage of a base station (e.g., an eNodeB) 200a of a macro cell. When a UE 100 which has been served by the BS 200a of the macro cell exists within coverage of the BS 300 of the small cell, the UE 100 may perform handover to the BS 300 of the small cell, obtaining an effect of offloading traffic of the BS 200a of the macro cell.

Here, handover from the BS 200a of the macro cell corresponding to a serving BS to the BS 300 of the small cell corresponding to a target BS is performed when strength of a reference signal of the target BS on the basis of strength (RSRP, RSRQ) of the reference signal received by the UE 100 from the serving BS is equal to or greater than a specific threshold value.

Here, even though strength of the received reference signal of the target BS is not greater than strength of the received reference signal of the serving BS by the threshold value or greater, handover may be performed to the target BS by using a certain means additionally or by improving capability of the UE 100. Such an operation results in expanding a cell range or a cell radius of the BS (e.g., pico eNodeB) 300 of the small cell corresponding to the target BS. In the drawing, the coverage expanded area larger than the basic coverage of the small cell 300 is shown to be shaded. Such a coverage expanded area may be called a Cell Range Expansion (CRE).

Here, when a threshold value used for general handover is expressed as $S_{th\_conv}$, an area available for CRE may be expressed as an area of $S_{th\_conv} \leq S_{received} \leq S_{th\_CRE}$.

Meanwhile, reception strength with respect to the reference signal from the small cell 300 may be expressed as RSRP/RSRQ measured by the UE 100.

In this manner, by expanding the basic coverage of the small cell 300 using the interference removal capability of the UE 100, an effect of offloading traffic to the small cell 300 may be obtained.

In other words, when the interference removal capability of the UE 100 is used, even though strength of a reference signal received from the small cell is not greater than strength of a reference signal received from the macro cell by more than a threshold value, handover to the small cell may be performed.

Disclosures of the Present Specification

Hereinafter, an interference cancellation function will be described in more detail in accordance with the disclosures of the present specification.

Figure 14:
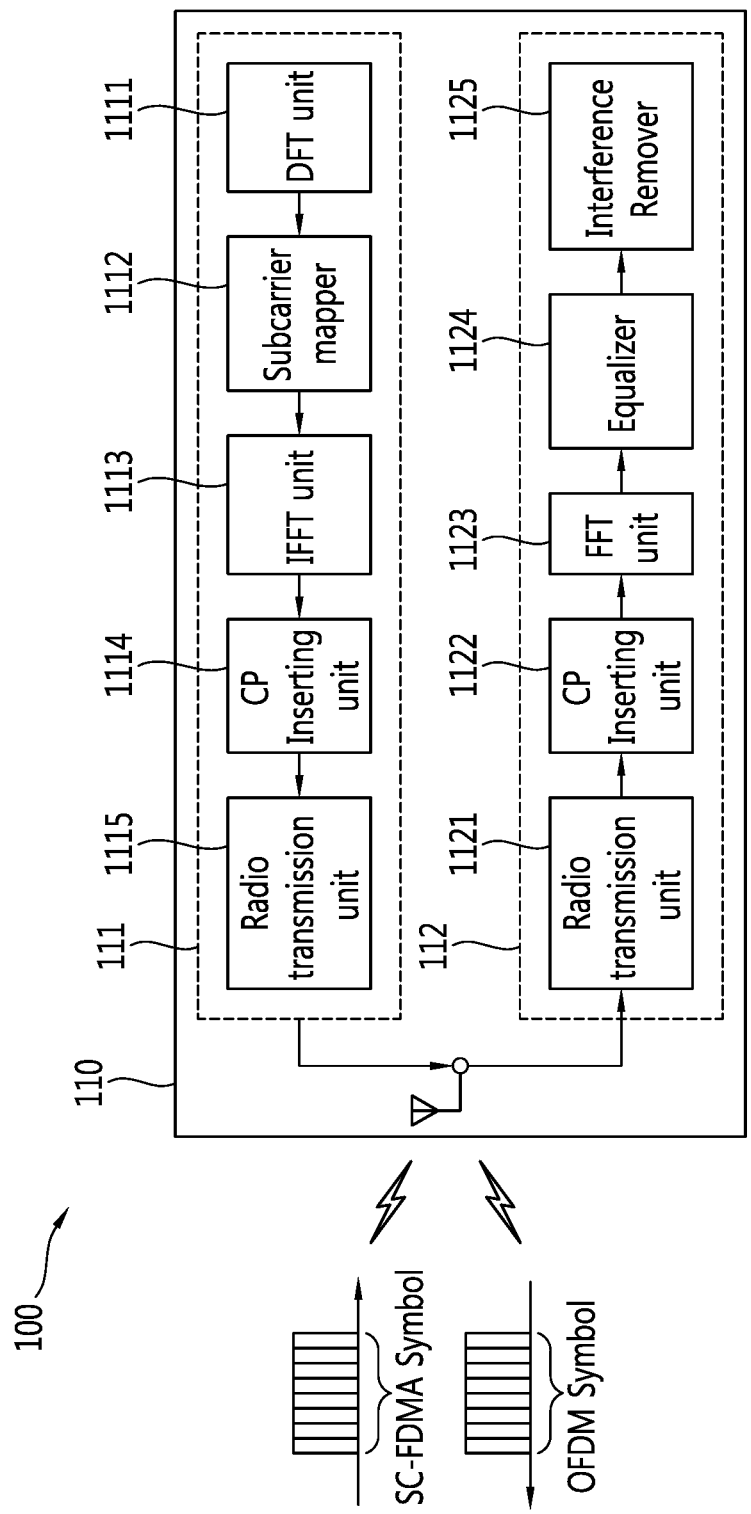
FIG. 14 is a block diagram illustrating a structure of a UE according to an embodiment of the present disclosure.

FIG. 14 is a block diagram illustrating a structure of a UE according to one embodiment of the present specification.

In LTE or LTE-A, OFDM is used for a downlink and SC-FDMA similar to OFDM is used for an uplink.

SC-FDMA may also be referred to as DISCRETE FOURIER TRANSFORM (DFT)-spread OFDM (DFT-s OFDM). When SC-FDMA is used, non-linear distortion of a power amplifier may be avoided, thus improving transmission power efficiency in a power consumption-limited terminal. Accordingly, user throughput may be enhanced.

SC-FDMA is substantially similar to OFDM in that SC-FDMA transmits signals via separate subcarriers using a Fast Fourier Transform (FFT) and Inverse FFT (IFFT). A conventional OFDM transmitter has a problem that signals in respective subcarriers on the frequency axis are converted into signals on the time axis by IFFT. That is, IFFT is a scheme of performing the same operation in parallel, and thus Peak-to-Average Power Ratio (PAPR) increases. To prevent increase in PAPR, SC-FDMA performs IFFT after DFT spreading, unlike OFDM. That is, a transmission mode in which IFFT is performed after DFT spreading is defined as SC-FDMA. Further, SC-FDMA is also referred to as DFT spread OFDM (DFT-s-OFDM).

SC-FDMA secures robustness to a multipath channel due to a similar structure to OFDM and basically resolves a disadvantage of conventional OFDM that is increase in PAPR by IFFT, thereby allowing efficient use of a power amplifier.

Referring to FIG. 14, the UE 100 includes a Radio Frequency (RF) unit 110. The RF unit 110 includes a transmitter 111 and a receiver 112. The transmitter 111 includes a Discrete Fourier Transform (DFT) unit 1111, a subcarrier mapper 1112, an IFFT unit 1113, a cyclic prefix (CP) insertion unit 1114, and a wireless transmission unit 1115. The transmitter 111 of the RF unit 110 may further include, for example, a scramble unit, a modulation mapper, a layer mapper, and a layer permutator, which may be disposed before the DFT unit 1111. That is, as described above, to prevent increase in PAPR, the transmitter of the RF unit 110 subjects data to the DFT unit 1111 before mapping a signal to a subcarrier. The signal spread (or precoded) by the DFT unit 1111 is mapped onto a subcarrier by the subcarrier mapper 1112 and subjected to the IFFT unit 1113 into a signal on the time axis.

That is, in SC-FDMA, unlike OFDM, PAPR of a signal in the time domain obtained via the IFFT unit 1113 is not substantially increased by correlations between the DFT unit 1111, the subcarrier mapper 1112, and the IFFT unit 1113, thereby providing favorable transmission power efficiency. That is, in SC-FDMA, PAPR or Cubic Meter (CM) may be decreased.

The DFT unit 1111 performs DFT on input symbols to output complex-valued symbols. For example, when Ntx symbols are input (here, Ntx is a natural number), DFT has a size of Ntx. The DFT unit 1111 may be referred to as a transform precoder. The subcarrier mapper 1112 maps the complex-valued symbols onto respective subcarriers in the frequency domain. The complex-valued symbols may be mapped onto resource elements corresponding to resource blocks allocated for data transmission. The subcarrier mapper 1112 may be referred to as a resource element mapper. The IFFT unit 1113 performs IFFT on the input symbols to output a baseband signal for data as a signal in the time domain. The CP insertion unit 1114 copies latter part of the baseband signal for data and inserts the latter part in front of the baseband signal for data. CP insertion prevents Inter-Symbol Interference (ISI) and Inter-Carrier Interference (ICI), thereby maintaining orthogonality even in a multipath channel.

Meanwhile, the 3GPP is actively carrying out standardization of LTE-Advanced, evolving from LTE, for which clustered DFT-s-OFDM allowing non-contiguous resource allocation is adopted.

Clustered DFT-s-OFDM is a modification of existing SC-FDMA, which divides data symbols having been subjected to a precoder into a plurality of sub-blocks and separately mapping the sub-blocks in the frequency domain. An important feature of clustered DFT-s-OFDM allows frequency selective resource allocation to deal with a frequency selective fading environment in a flexible manner.

Here, clustered DFT-s-OFDM adopted as an uplink access mode for LTE-Advanced allows non-contiguous resource allocation, unlike SC-FDMA as an uplink access for LTE, and thus transmitted uplink data may be divided into a plurality of cluster units.

That is, the LTE system is configured to maintain a single carrier characteristic in an uplink, whereas the LTE-A system allows non-contiguous allocation of DFT-precoded data to the frequency axis or simultaneous transmissions of a PUSCH and PUCCH.

Meanwhile, the receiver 112 of the RF unit 110 includes a wireless reception unit 1121, a CP cancellation unit 1122, an FFT unit 1123, an equalizer unit 1124, and an interference cancellation unit 1125. The wireless reception unit 1121, the CP cancellation unit 1122, and the FFT unit 1123 of the receiver perform reverse functions of the wireless transmission unit 1115, the CP insertion unit 1114, and the IFFT unit 1113 of the transmitter 111.

The interference cancellation unit 1124 cancels or relieves interference included in a received signal.

The receiver 112 in which the interference cancellation unit 1124 is added, co-called an Interference Cancellation (IC) receiver or an Interference Rejection Combiner (IRC) receiver may be implemented by deducting interference signal from reception signals, conceptually.

At the moment, the complexity of the receiver in which the interference cancellation unit 1124 is added is dependent upon the maximum number of cells which are objects of interference cancellation and the sort of signals which will be canceled.

The signals which are objects of interference cancellation include a Cell-specific Reference Signal (CRS), a Physical Broadcasting Channel (PBCH), a Sync CHannel (SCH), a Physical Downlink Shared CHannel (PDSCH), and the like.

The receiver 112 in which the interference cancellation unit 1124 is added, co-called the IC receiver or the IRC receiver may cope with wireless data requirements which are explosively increased. Particularly, since the increase in reception performance is obtainable without significant increase of complexity, significant performance gain is obtainable in the environment in which interference from neighboring base station is dominant.

Thus, the disclosures of the present specification propose schemes of reducing or removing interference by at least one cell (or interfering cell) adjacent to the serving cell. Specifically, a first disclosure proposes a scheme of removing interference by PBCH and a second disclosure proposes a scheme of removing interference by a CRS, among the disclosures of the present specification.

The first and second disclosures of the present specification will be hereinafter described in more detail.

I. The First Disclosure of the Present Specification

As mentioned above, the first disclosure of the present specification proposes the scheme of removing interference by PBCH. First, interference by PBCH is shown below.

Figure 15A:
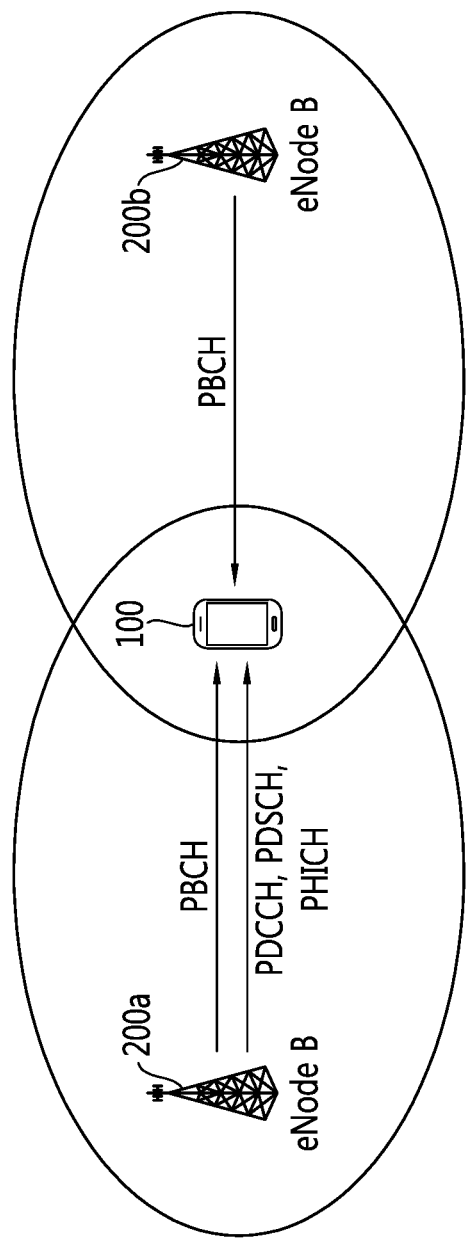
FIGS. 15A and 15B are views illustrating a situation in which a PBCH is introduced from an interference cell.
Figure 15B:
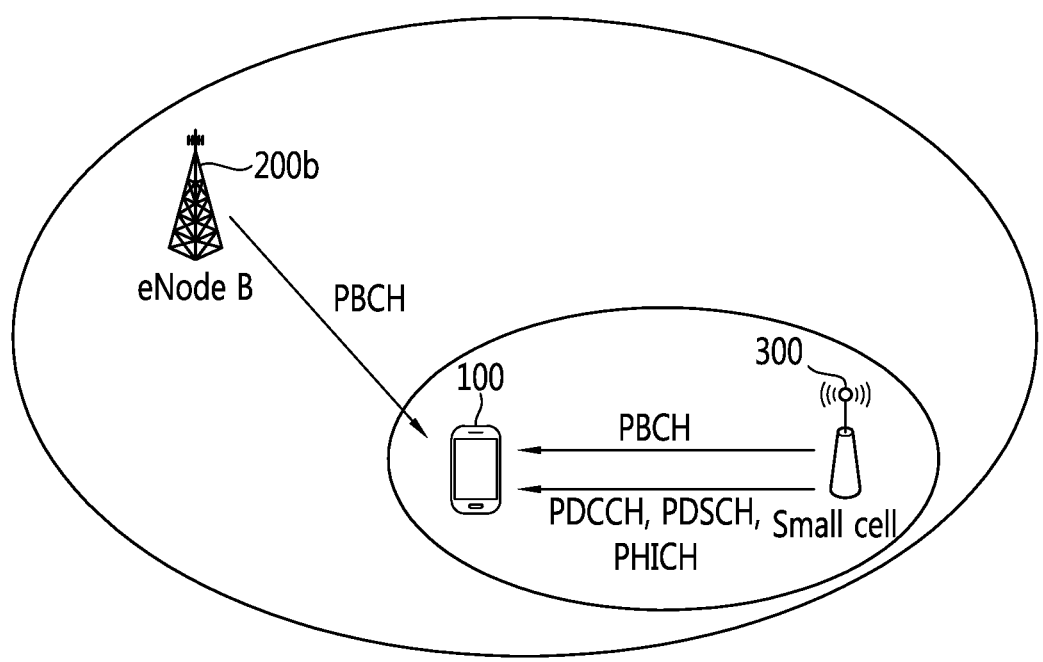

FIGS. 15A and 15B are views illustrating a situation in which a PBCH is introduced from an interference cell.

Referring to FIG. 15A, a situation in which a serving cell of a UE 100 is a first eNodeB 200a and a neighbor cell causing interference is a second eNodeB 200b is illustrated. When the second eNodeB 200b, a neighbor cell causing interference, transmits a PBCH, the PBCH may interfere in any one of a PBCH, PDCCH, PDSCH, PCFICH, and PHICH from the first eNodeB, a serving cell.

Meanwhile, referring to FIG. 15B, a situation in which, when the small cell 300 exists in an overlapping manner within coverage of the second eNodeB 200b corresponding to a macro cell, a serving cell of the UE 100 is the small cell 300 and a neighbor cell causing interference is the second eNodeB 200b is illustrated. Even in this case, similarly, when the second eNodeB 200b causing interference transmits a PBCH, the PBCH may interfere in any one of PBCH, PDCCH, PDSCH, PCFICH, and PHICH from the small cell 300 as a serving cell.

FIGS. 16A through 16D are views illustrating an influence when a PBCH is introduced from an interference cell.

Figure 16A:
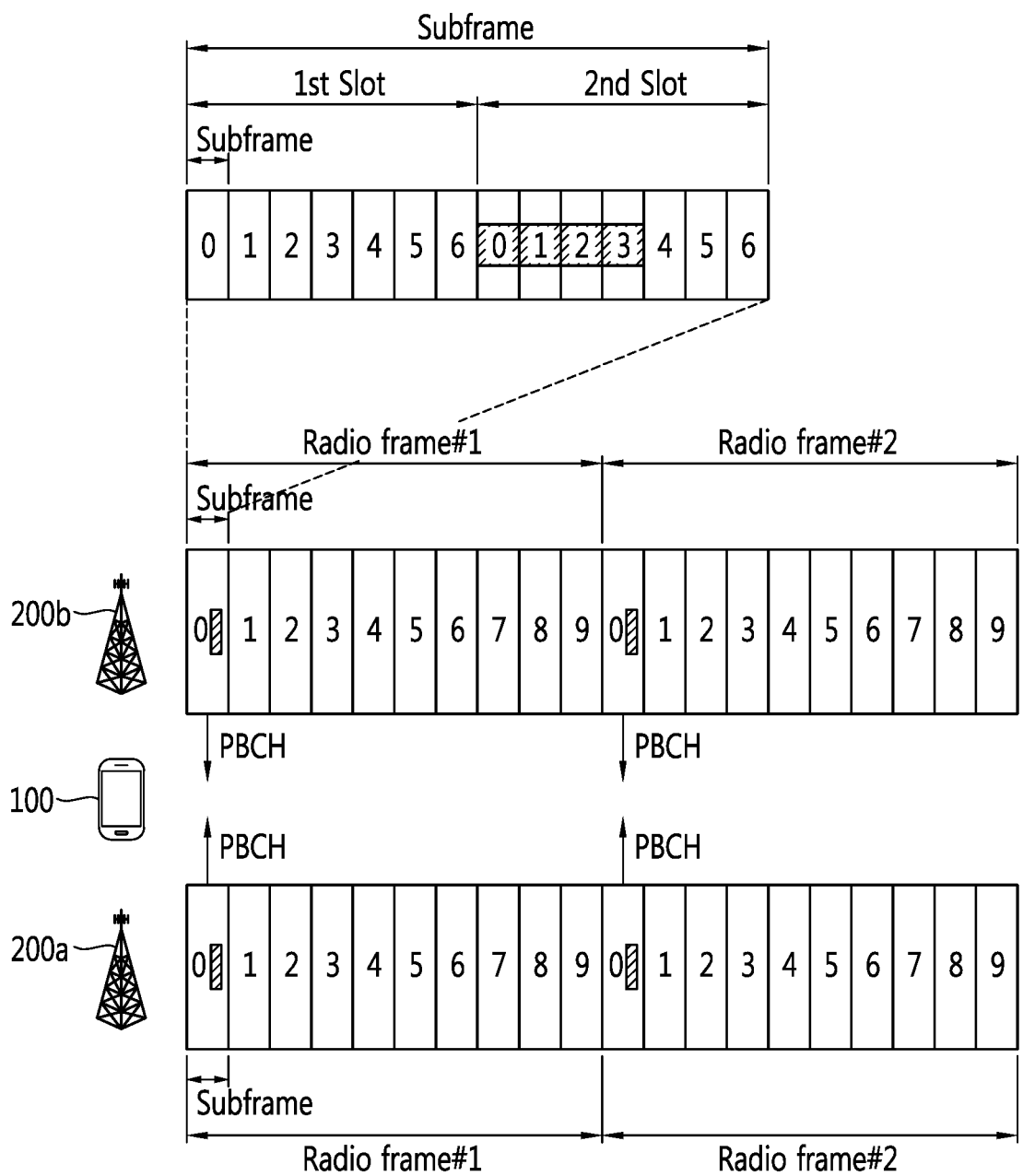
FIGS. 16A through 16D are views illustrating an influence when a PBCH is introduced from an interference cell.

First, as can be seen with reference to FIG. 16A, in a case in which downlink is synchronized between a first eNodeB 200a corresponding to a serving cell of the UE 100, and a second eNodeB 200b (or a small cell) corresponding to a neighbor interference cell (i.e., when a timing offset is 0), a PBCH from the interference cell 200b interferes in a PBCH of the serving cell 200a.

Figure 16B:
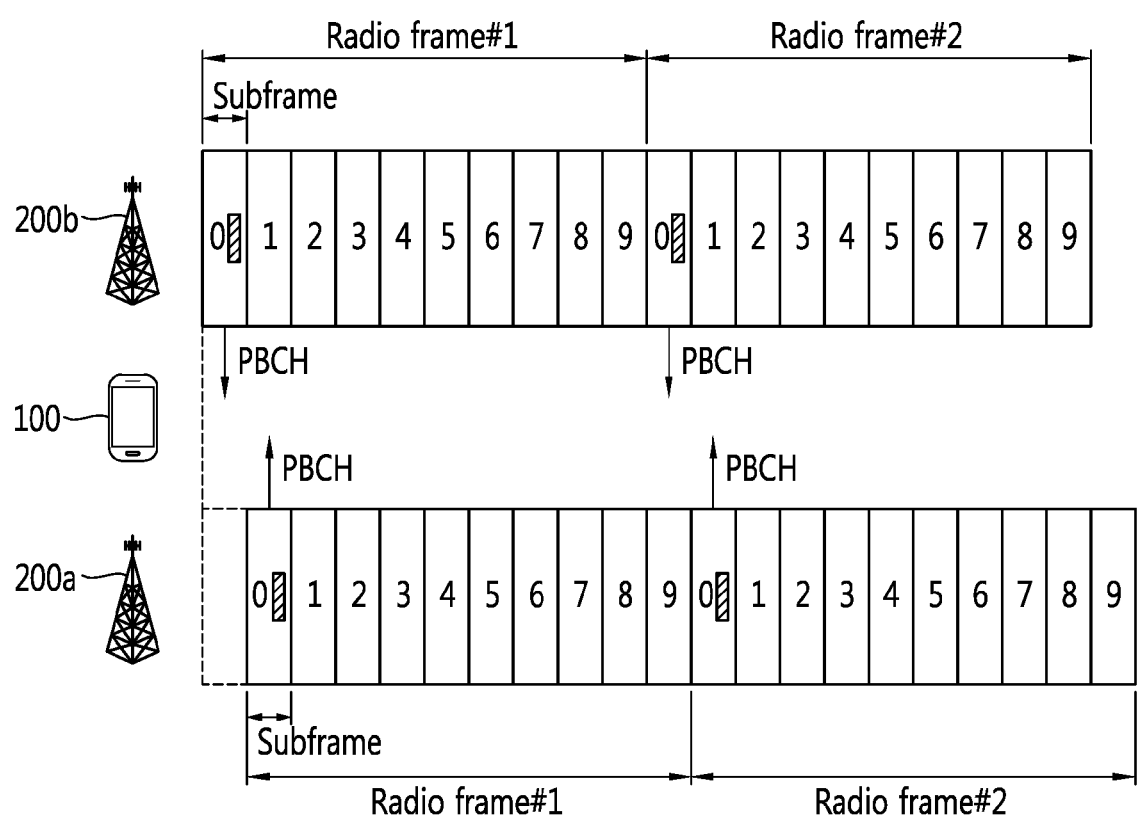

However, as can be seen with reference to FIG. 16B, in a case in which downlink synchronization is not matched between the serving cell 200 and the neighbor interference cell 200b and the timing offset is a subframe unit, a PBCH from the interference cell 200b interferes in downlink data (e.g., a PDSCH).

Figure 16C:
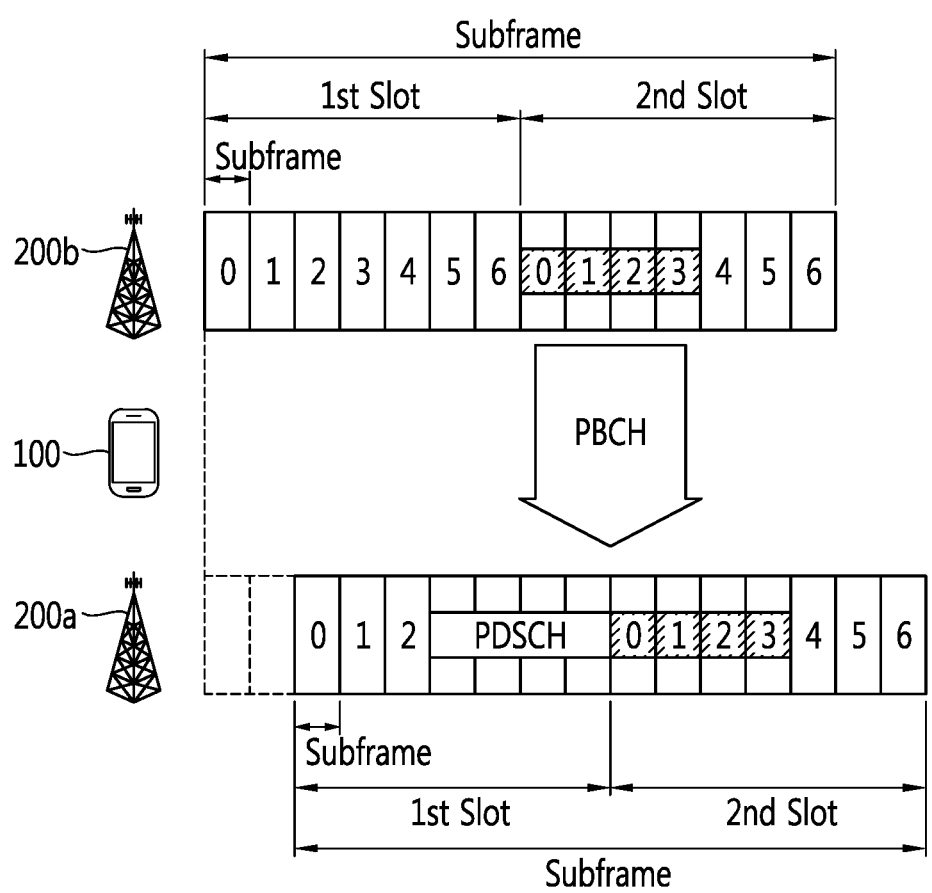

Similarly, as can be seen with reference to FIG. 16C, in a case in which downlink synchronization is not matched between the serving cell 200a and the neighbor cell 200b and a timing offset thereof is 1 to 6 symbols or 11 to 13 symbols, a PBCH from the interference cell 200b interferes in downlink data (e.g., a PDSCH) from the serving cell 200a.

Figure 16D:
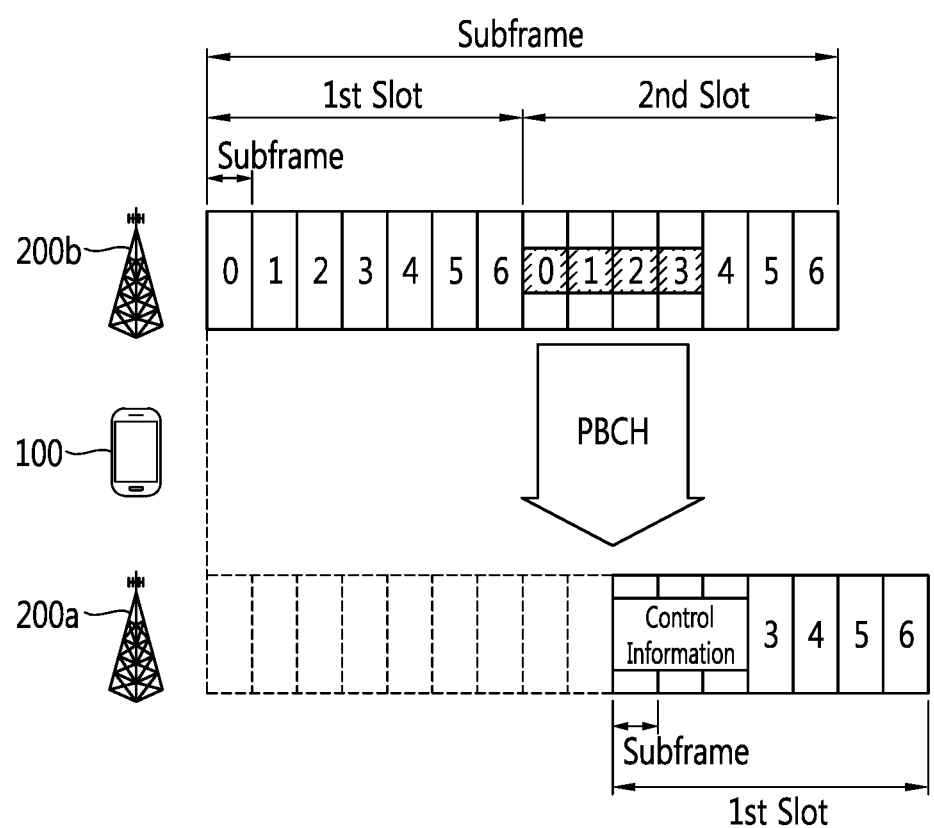

As can be seen with reference to FIG. 16D, in a case in which downlink synchronization is not matched between the serving cell 200a and the neighbor cell 200b and a timing offset thereof is 7 or 8 symbols, a PBCH from the interference cell 200b interferes in control information (e.g., a PDCCH, a PCFICH, or a PHICH) from the serving cell 200a.

Although not shown, in a case in which a downlink timing offset between the serving cell 200a and the neighbor interference cell 200b is 9 and 10 symbols, a PBCH from the interference cell 200b interferes in the control information (e.g., a PDCCH, a PCFICH, or a PHICH) as well as downlink data (e.g., a PDSCH) from the serving cell 200a.

As can be seen with reference to FIGS. 16A through 16D, the UE 100 should cancel interference by the PBCH from the neighbor interference cell 200b.

In general, a UE that does not consider interference by a neighbor cell or an eNB performs channel estimation using a CRS for demodulating a signal received from the eNB.

Figure 17:
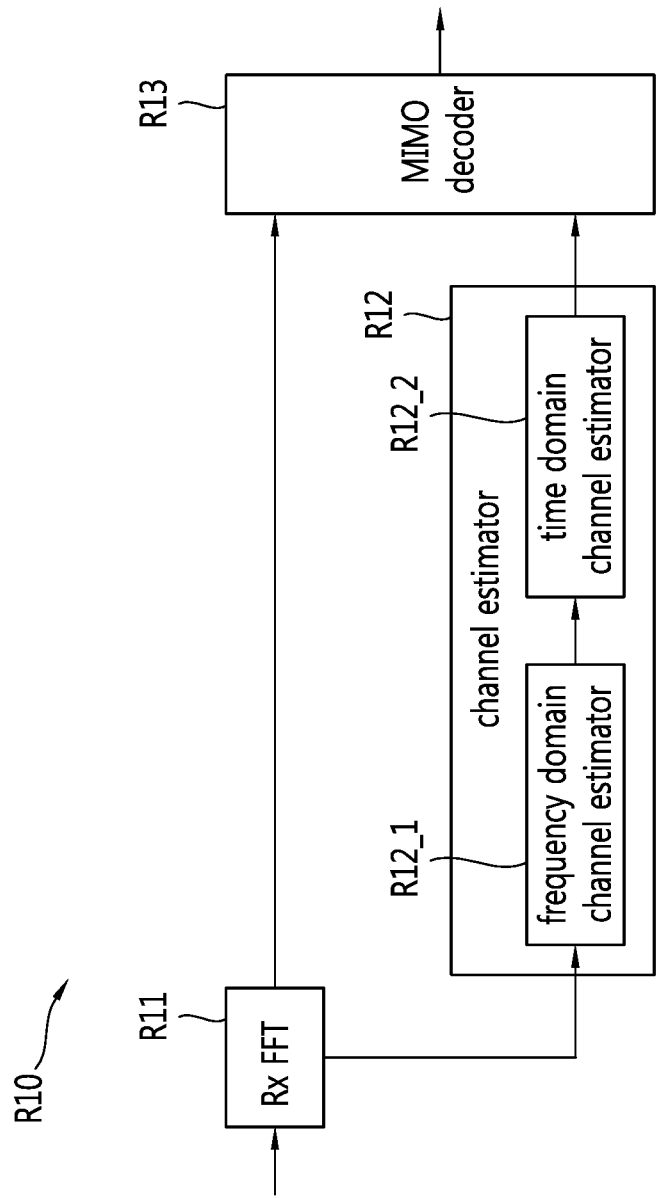
FIG. 17 illustrates an example of a structure of a general PBCH receiver.

FIG. 17 illustrates an example of a structure of a general PBCH receiver.

FIG. 17 illustrates a structure of a PBCH receiver R10 including a channel estimator R12 using a CRS.

Referring to FIG. 17, the channel estimator R12 is divided into a frequency domain channel estimator R12_1 that performs channel estimation in the frequency domain and a time domain channel estimator R12_2 that performs channel estimation in the time domain.

An RX FFT unit R11 converts a received signal into a frequency signal through FFT. A channel value is estimated in the frequency domain and the time domain using a CRS assigned between a base station and a UE from a frequency domain reception signal. An MIMO decoder R13 uses the estimated channel value and the frequency domain reception signal, finally demodulating data.

The purpose of a general channel estimator is to estimate a channel that a CRS experiences using the CRS and a channel that PBCH undergoes through interpolation.

In this case, an exact frequency domain channel response of the channel that PBCH experiences may be obtained on the basis of Pa, Pb information that notifies of a transmit power difference between an OFDM symbol including an RS and an OFDM symbol including no RS.

However, the general channel estimator does not consider a case that interference by a neighbor base station is large. If PBCH for an interference signal transmitted from a neighbor base station exists, a reliability of an estimated channel value and demodulated data may be decreased.

Thus, the first disclosure of the present specification proposes a scheme of obtaining PBCH information by decoding PBCH transmitted by a cell that neighbors a serving cell to cause interference in a received signal, estimating a channel for PBCH based on the obtained PBCH information, generating an interference signal based on the PBCH information and the estimated channel for PBCH, and removing the generated interference signal from the received signal.

Particularly, the first disclosure of the present specification is as follows.

Figure 18:
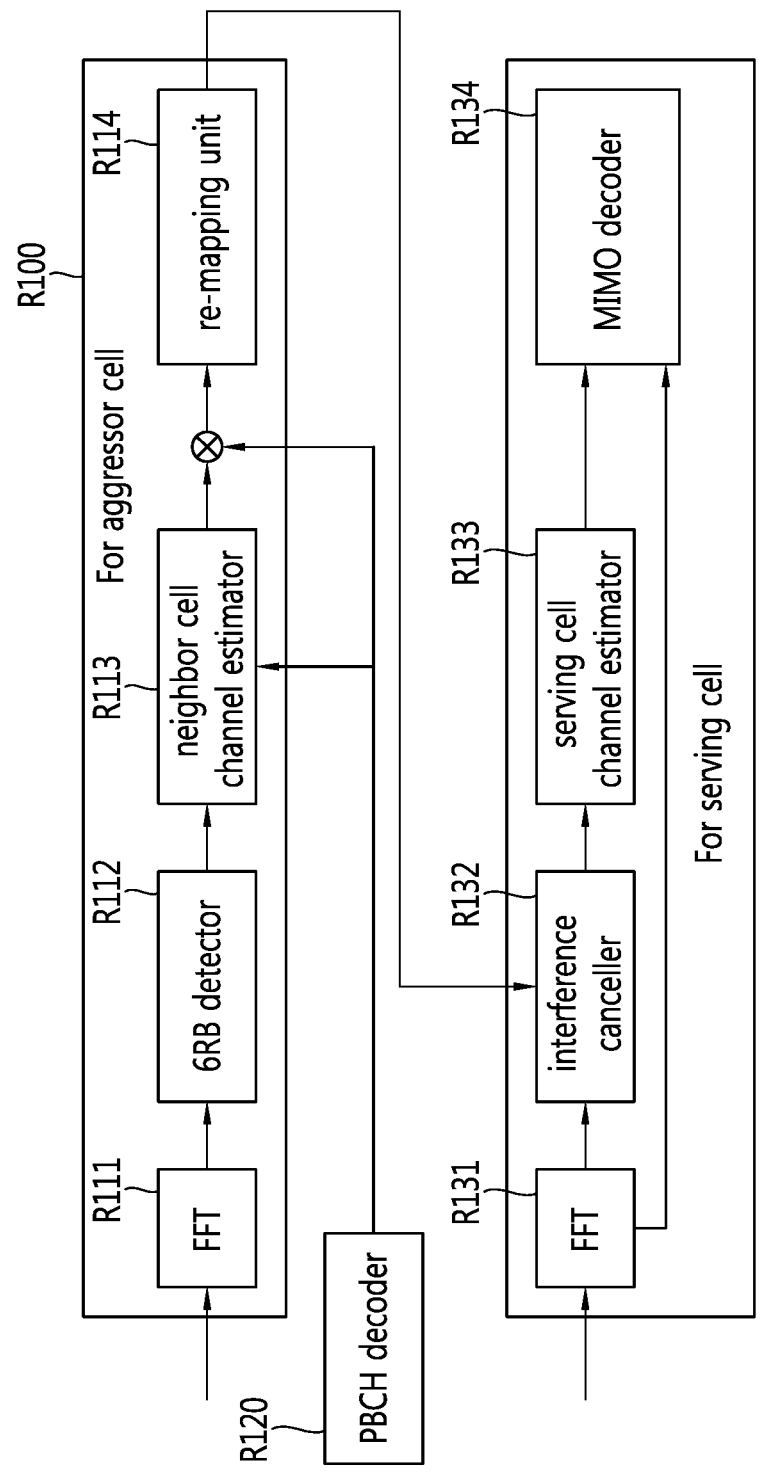
FIG. 18 is a block diagram illustrating a structure of an IRC device according to an embodiment of the present invention.

FIG. 18 is a block diagram illustrating a structure of an IRC in accordance with the first disclosure of the present specification.

Referring to FIG. 18, the first disclosure of the present specification proposes a scheme of obtaining interference PBCH information on a neighbor cell in a state where it is assumed that a UE does not know a power ratio of a CRS and PBCH, to solve the above-mentioned problems.

In particular, a UE R100 in accordance with the first disclosure of the present specification may first obtain PBCH information on an interference signal from a neighbor cell to generate (or regenerate) an interference signal by PBCH transmitted by the neighbor cell (or an aggressor cell) that neighbors a serving cell.

For example, the UE in accordance with the first disclosure of the present specification receives a signal from a serving cell, and decodes PBCH, which is transmitted by a cell adjacent to the serving cell to cause interference in the received signal, obtaining PBCH information.

The PBCH information may be obtained by a PBCH decoder R120, which decodes PBCH transmitted by a neighbor cell or an aggressor cell.

In accordance with the first disclosure of the present specification, the PBCH information may be secured through CRS-based channel estimation. To this end, the PBCH decoder R120 may acquire interference PBCH information by adopting a CRS-based channel estimation technique. For example, the PBCH decoder R120 may obtain the PBCH information by decoding PBCH through CRS-based channel estimation.

An interference signal generator R110 may include a first FFT unit R111 that performs FFT on a received signal, a 6RB detector R112 that detects 6RBs for channel estimation, a neighbor cell channel estimator R113 that estimates a channel for a neighbor cell and a re-mapping unit R114.

The neighbor cell channel estimator R113 estimates a channel that interference signal PBCH experiences for interference cancellation, using the obtained interference PBCH information.

For example, the UE in accordance with the first disclosure of the present specification may estimate the channel for PBCH based on the obtained PBCH information.

The UE may generate an interference signal based on the PBCH information and the estimated channel for PBCH.

Particularly, the estimated channel is multiplied by interference PBCH information, and an interference signal is (re)generated by the re-mapping unit R114.

A serving cell receiver R130 demodulates a signal received from the serving cell, and may include a second FFT unit R131, an interference canceller R132, a serving cell channel estimator R133 that estimates a channel for the serving cell, and an MIMO decoder R134.

In accordance with the first disclosure of the present specification, the UE may remove the generated interference signal from the received signal.

In particular, the interference canceller R132 removes the (re)generated interference signal from the received signal, and the serving cell channel estimator R133 estimates a channel for the serving cell.

The MIMO decoder R134 finally demodulates data using a received signal converted into a frequency domain through the second FFT unit R131 and channel estimates for the serving cell.

For example, the (re)generated interference signal is used to remove an interference signal from a received signal, and channel estimation for the serving cell and PBCH decoding are performed.

Meanwhile, the UE in accordance with the first disclosure of the present specification may consecutively remove an interference signal by generating the interference signal by at least one PBCH and first removing it from a received signal, when at least one neighbor cell other than a cell adjacent to a serving cell exists and signal strength of at least one PBCH transmitted by at least one neighbor cell is greater than signal strength of PBCH transmitted by a cell adjacent to the serving cell. Particularly, the first disclosure of the present specification will be described with reference to FIG. 19 as follows.

Figure 19:
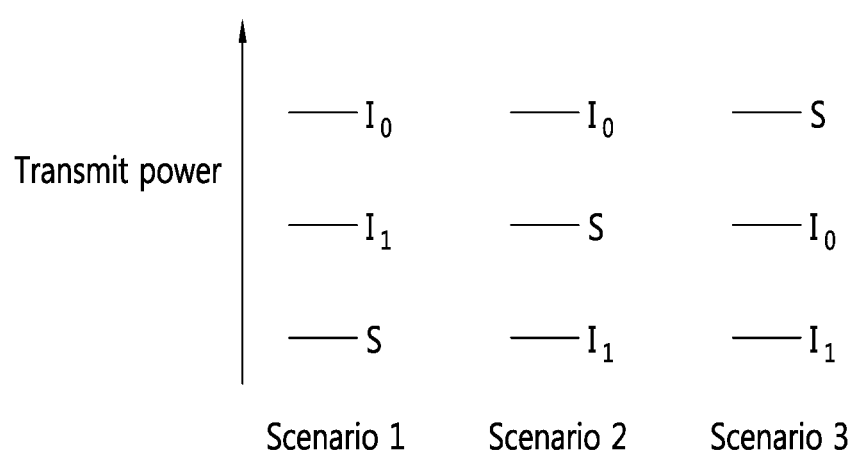
FIG. 19 is a view illustrating a method for removing interference according to an embodiment of the present invention.

FIG. 19 is a view illustrating a method for removing interference in accordance with the first disclosure of the present specification.

FIG. 19 depicts, for example, a case that there are two neighbor cells or two aggressor cells. Referring to FIG. 19, the UE R100 may first decode PBCH for a first cell with a largest power.

After that, when decoding PBCH for a cell with a second largest power, the UE R100 regenerates an interference signal of the first cell, removes interference, and decodes PBCH.

When decoding PBCH for a final cell, the UE R100 simultaneously regenerates and removes interference signals of first two cells and decodes PBCH. This equally applies to N cells.

In particular, as illustrated in FIG. 19, in the case of Scenario 1, the UE R100 removes interference signals 10, 11 which have large power in descending order from a received signal.

Next, like Scenario 2 and 3, when power of a signal (S) of the serving cell is larger than an interference signal, the UE R100 considers the signal (S) of the serving cell as an interference signal and removes it, extracting interference signals for all of the neighbor cells.

Figure 20:
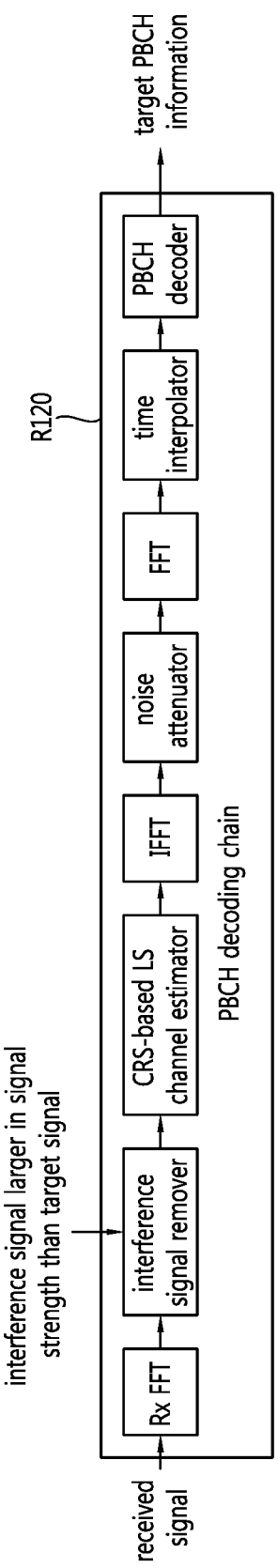
FIG. 20 is a block diagram illustrating a process of obtaining PBCH information through PBCH decoding according to an embodiment of the present invention.

FIG. 20 is a block diagram illustrating a process of obtaining PBCH information through PBCH decoding in accordance with the first disclosure of the present specification.

FIG. 20 illustrates a channel estimation scheme for decoding PBCH for an aggressor cell, and the channel estimation scheme may use CRS.

Referring to FIG. 20, the UE in accordance with the first disclosure of the present specification may estimate a channel value through a CRS-based LS estimator in the frequency domain, remove noise from the channel value in the time domain, perform time interpolation on the noise-removed channel value, and decode PBCH based on the time-interpolated channel value.

Particularly, a PBCH decoder R120 may extract PBCH information on at least one cell adjacent to a serving cell.

When there is an interference signal with larger power than a target signal (or a target PBCH signal) for a target cell that is a certain neighbor cell from which PBCH information is to be obtained, the PBCH decoder R120 removes the interference and estimates a channel.

A channel estimating process is similar or equal to a serving cell channel estimation method, and operates at 128 point (128 point FFT/IFFT).

In particular, the PBCH decoder R120 performs FFT on a received signal (performed by an Rx FFT unit), removes an interference signal with signal strength larger than a target signal from the received signal (performed by an interference signal remover), estimates a channel for a target cell in a CRS-based LS channel estimation technique (performed by the CRS-based LS estimator), reduces or removes noise in the time domain through an IFFT unit (performed by a noise attenuator), performs interpolation in the time domain via an FFT unit (performed by a time interpolator and finally decodes PBCH (performed by a PBCH decoding unit), obtaining PBCH information on the target cell.

Figure 21:
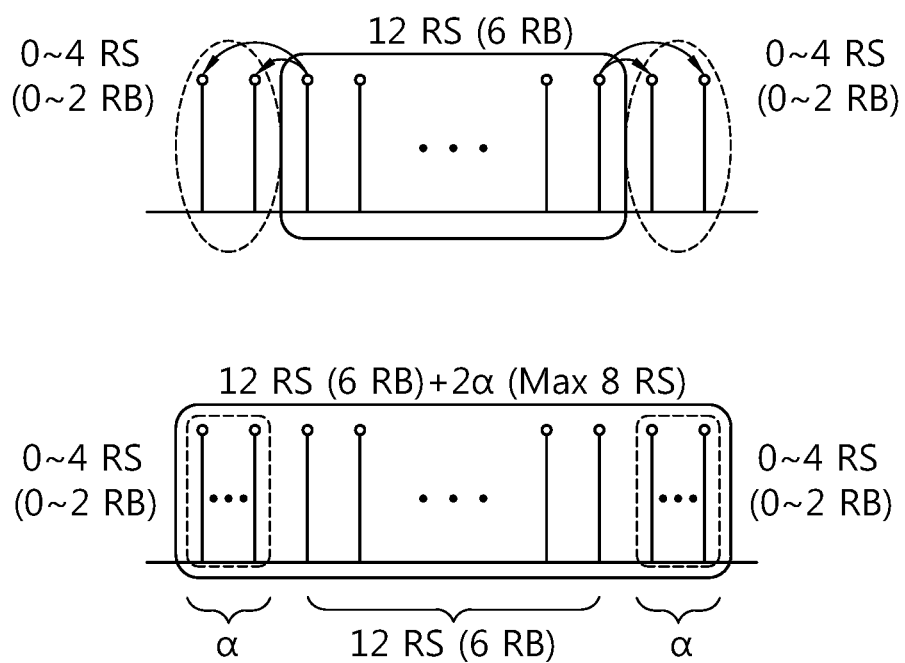
FIG. 21 is a view illustrating a band edge compensation technique in the LS channel estimation according to an embodiment of the present invention.

FIG. 21 is a view illustrating a band edge compensation technique in the LS channel estimation according to an embodiment of the present invention.

FIG. 21 illustrates the band edge compensation technique for preventing performance degradation at the band edge, which may occur in the LS channel estimation.

In accordance with the first disclosure of the present specification, the LS estimator may operate in a predetermined frequency bandwidth and set a channel value corresponding to the frequency domain of a reception frequency bandwidth out of the predetermined frequency bandwidth as a channel value corresponding to the CRS location of both ends of the predetermined frequency bandwidth when it is required that the channel value is estimated with the reception frequency bandwidth greater than the predetermined frequency bandwidth.

The predetermined frequency bandwidth may be a frequency bandwidth corresponding to 6RBs.

Particularly, referring to FIG. 21, if the UE does not know a frequency bandwidth of an aggressor cell, the UE assumes 1.4 MHz and copies a channel value corresponding to the CRS location of both ends of 72 resources like a method used in conventional serving cell channel estimation, preventing performance deterioration at the ends of the frequency band (see an upper drawing of FIG. 21).

Meanwhile, if the UE knows a frequency bandwidth of an aggressor cell, the UE may estimate a channel corresponding to a frequency band larger than PBCH that uses 72 resources, using all of the corresponding CRSs within 128 points (see an upper drawing of FIG. 21).

Figure 22:
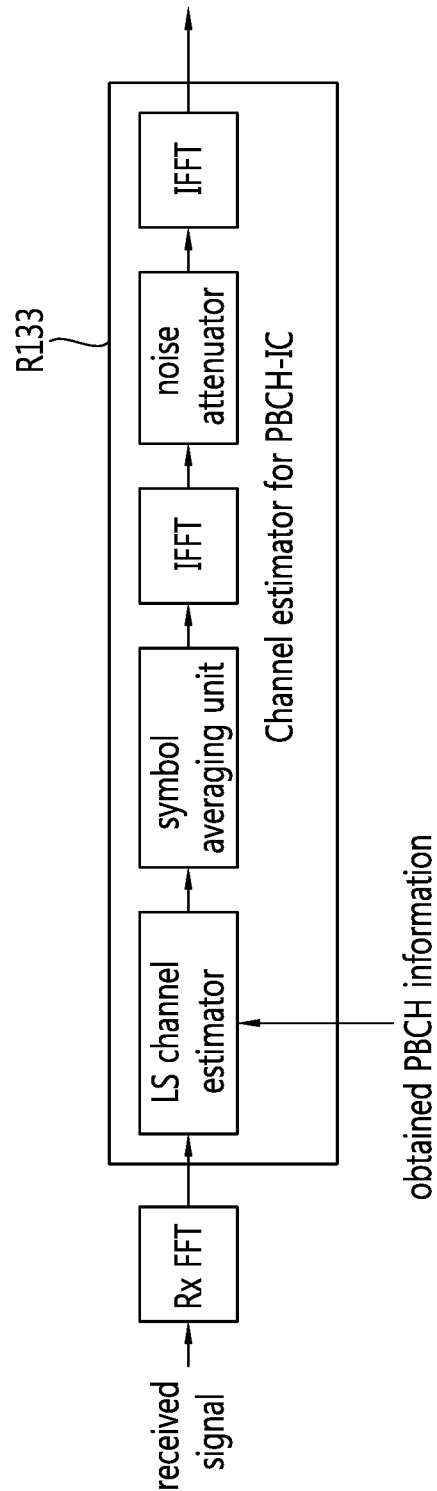
FIG. 22 is a block diagram illustrating a channel estimation technique for PBCH Interference Cancellation (PBCH-IC) according to an embodiment of the present invention.

FIG. 22 is a block diagram illustrating a channel estimation technique for PBCH-IC according to an embodiment of the present invention.

Referring to FIG. 22, the channel estimation technique for PBCH-IC according to an embodiment of the present invention may be performed by a serving cell channel estimator R133.

In accordance with the first disclosure of the present specification, the serving cell channel estimator R133 performs channel estimation based on the signal and the PBCH information, produces an average of the channel estimates in a predetermined OFDM symbol section, and performs frequency interpolation on the produced average, estimating a channel for PBCH.

Particularly, referring to FIG. 22, the serving cell channel estimator R133 performs LS estimation using aggressor PBCH information which has already been obtained. A method for estimating a channel that PBCH experiences in the frequency domain may vary according to the number of antenna ports used.

Since LS estimation is performed on the basis of PBCH information, channel estimates for a total of four symbols are output by the LS channel estimator.

After that, the serving cell channel estimator R133 calculates an average between the symbols (performed by a symbol averaging unit) and converts the calculated average into a time domain signal (performed by an IFFT unit).

The serving cell channel estimator R133 filters noise through a noise attenuator and converts the time domain signal into a frequency domain signal through an FFT unit, performing channel estimation.

As mentioned above, the LS channel estimation method for estimating a channel that PBCH experiences in the frequency domain may vary according to the number of antenna ports used as follows.

1. When using a single antenna port
   : Channel estimation is performed through a general LS channel estimator.
2. When using two or more antenna ports
   : An SFBC decoding technique is applied. PBCH is transmitted through an SFBC process with respect to two or more transmit antennas. Therefore, the UE may estimate a channel through SFBC decoding using known PBCH information.

For example, the channel estimation may be performed through the LS estimator when there is a single receive antenna port and through SFBC decoding when there are two or four receive antenna ports.

Figure 23:
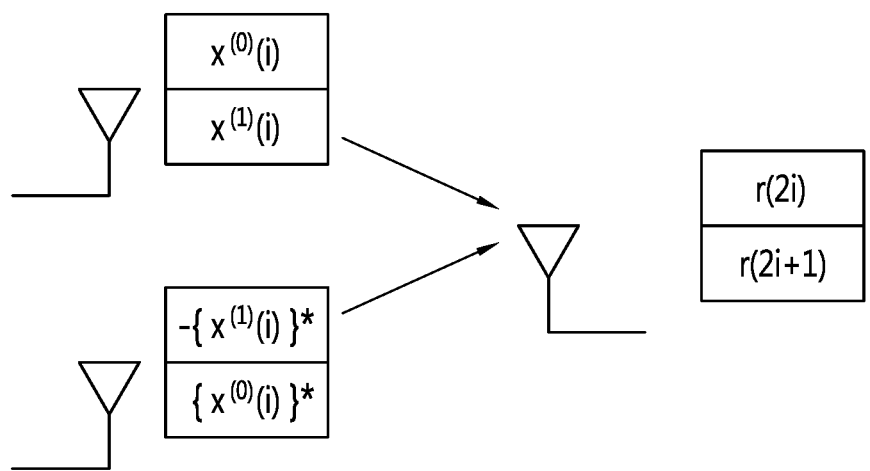
FIG. 23 is a view illustrating a channel estimation technique based on SFBC decoding according to an embodiment of the present invention.

FIG. 23 is a view illustrating a channel estimation technique based on SFBC decoding according to an embodiment of the present invention.

FIG. 23 illustrates the channel estimation technique based on SFBC decoding in the case of using two antenna ports.

Referring to FIG. 23, a received signal may be expressed as Equation 12 below only in view of $2i^{th}$ and $(2i+1)^{th}$ subcarriers.

$$r(2i) = \frac{1}{\sqrt{2}}[h_1(2i)x^{(0)}(i) - h_2(2i)\{x^{(1)}(i)\}^* + n(2i)] \quad \text{[Equation 12]}$$

$$r(2i+1) = \frac{1}{\sqrt{2}}[h_1(2i+1)x^{(1)}(i) + h_2(2i+1)\{x^{(0)}(i)\}^* + n(2i+1)]$$

In this case, n(i) corresponds to Adaptive White Gaussian Noise (AWGN) added to an $i^{th}$ subcarrier signal, and $h_1(i)$ and $h_2(i)$ mean channels that an $i^{th}$ subcarrier signal from a first antenna and a second antenna undergoes, respectively.

When it is assumed that channels that neighbor subcarrier signals experience are similar to each other ($h_r(2i)$–$h_r(2i+1)$), the received signal may be expressed in the form of matrix as Equation 13 below.

$$r = Hx + n \quad \text{[Equation 13]}$$

$$\begin{bmatrix} r(2i) \\ r(2i+1) \end{bmatrix} = \frac{1}{\sqrt{2}}\begin{bmatrix} x^{(0)}(i) & -\{x^{(1)}(i)\}^* \\ x^{(1)}(i) & \{x^{(0)}(i)\}^* \end{bmatrix}\begin{bmatrix} h_1(2i) \\ h_2(2i) \end{bmatrix} + \begin{bmatrix} n(2i) \\ n(2i+1) \end{bmatrix}$$

When SFBC decoding is performed using known PBCH information, determined channel information may be expressed as Equation 14 below.

$$\begin{bmatrix} \hat{h}_1(2i) \\ \hat{h}_2(2i) \end{bmatrix} = \frac{1}{\sqrt{2}}\begin{bmatrix} \{x^{(0)}(i)\}^* & \{x^{(1)}(i)\}^* \\ -x^{(1)}(i) & x^{(0)}(i) \end{bmatrix}\begin{bmatrix} r(2i) \\ r(2i+1) \end{bmatrix} \quad \text{[Equation 14]}$$

Meanwhile, in the case of using four antenna ports, when SFBC decoding is performed by applying the same assumption in the aforementioned method, channel information like Equation 15 below may be obtained as follows.

$$\begin{bmatrix} \hat{h}_1(4i) \\ \hat{h}_2(4i) \end{bmatrix} = \frac{1}{\sqrt{2}}\begin{bmatrix} \{x^{(0)}(i)\}^* & \{x^{(1)}(i)\}^* \\ -x^{(1)}(i) & x^{(0)}(i) \end{bmatrix}\begin{bmatrix} r(4i) \\ r(4i+1) \end{bmatrix} \quad \text{[Equation 15]}$$

$$\begin{bmatrix} \hat{h}_3(4i) \\ \hat{h}_4(4i) \end{bmatrix} = \frac{1}{\sqrt{2}}\begin{bmatrix} \{x^{(2)}(i)\}^* & \{x^{(3)}(i)\}^* \\ -x^{(3)}(i) & x^{(2)}(i) \end{bmatrix}\begin{bmatrix} r(4i+2) \\ r(4i+3) \end{bmatrix}$$

Thus, use of the channel estimation method and the interference cancellation method proposed in the first disclosure of the present specification, may increase target cell detection performance or data demodulation performance that are decreased by PBCH interference from a neighbor cell.

II. The Second Disclosure of the Present Specification

As mentioned above, the second disclosure of the present specification proposes a scheme of removing interference by a CRS. First, interference by a CRS is shown below.

Figure 24A:
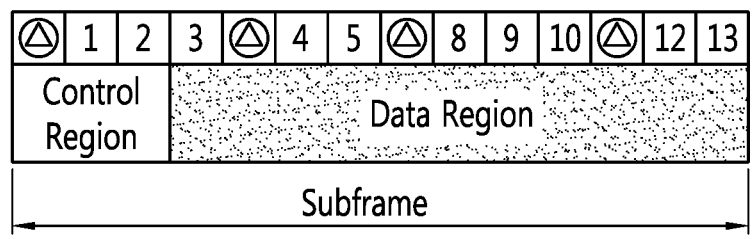
FIGS. 24a and 24b show an interference caused by a CRS of a neighboring cell.
Figure 24B:
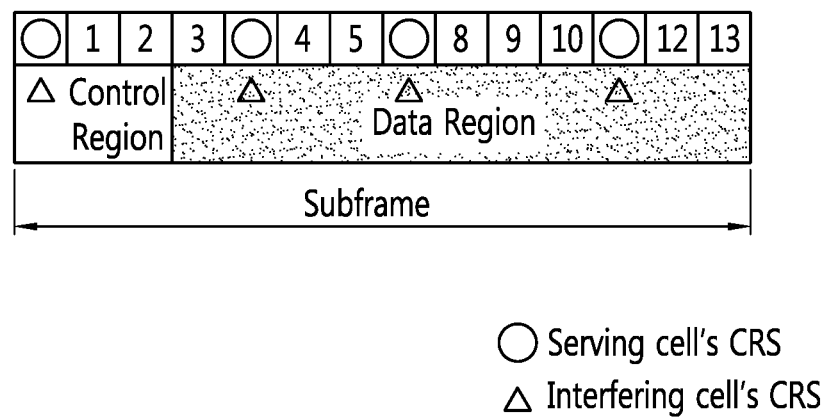

FIGS. 24A and 24B shows an interference caused by a CRS of a neighboring cell.

Referring to FIG. 24A, if CRSs collide with each other between a serving cell and an interfering cell, a reliability of the CRS of the serving cell is increased when removing the CRS from an interfering neighboring cell by performing an interference cancellation on the CRS.

However, as shown in FIG. 24B, even if CRSs do not overlap with each other between the serving cell and the interfering neighboring cell, the CRS of the interfering neighboring cell collides with data of the serving cell. In this case, there is no significant change in a reliability of channel estimation through the CRS of the serving cell. On the other hand, actual noise power of a data region overlapping with the CRS of the neighboring cell is decreased with respect to noise power estimated through the CRS of the serving cell.

As a result, if the interference cancellation is performed on the CRS, the aforementioned demodulation process needs to be improved.

Generally, a UE not considering interference by a neighbor cell performs channel estimation using a CRS for demodulating a signal received from a base station.

Figure 25:
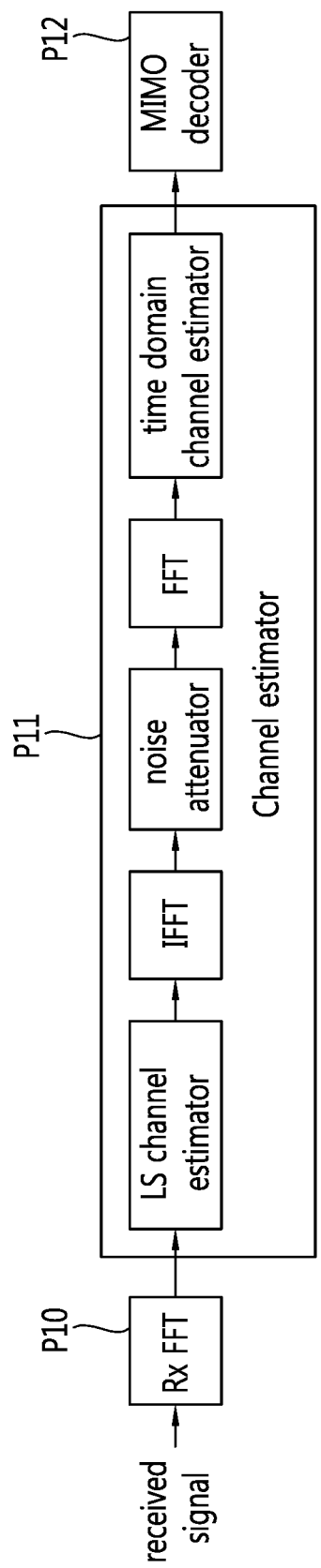
FIG. 25 is a block diagram illustrating a general LS channel estimation process based on CRS.

FIG. 25 is a block diagram illustrating a general channel estimation process based on a CRS.

Referring to FIG. 25, the general LS channel estimation process based on a CRS is as follows.

Especially, an LS channel estimator of FIG. 25 may adopt a Discrete Fourier Transform (DFT)-based channel estimation method.

First, a time domain reception signal may be converted into a frequency domain signal through an FFT unit P10.

After this, the UE estimates a channel for a serving cell through a channel estimator P11.

Particularly, the UE performs LS channel estimation based on a known CRS with a frequency domain signal converted through the LS channel estimator.

Since output of LS channel estimation is in a state where the noise is not removed, the UE performs IFFT for reducing the effect of noise to attenuate or remove a noise component through a noise attenuator and performs FFT for obtaining a frequency domain channel response.

As a channel of an estimated frequency domain is a channel component for an OFDM symbol including a CRS, the UE may secure a frequency domain channel response that all of the OFDM symbols experience by performing time domain interpolation through a time domain channel estimator to obtain a channel component for an OFDM symbol not including a CRS.

The UE finally demodulates a received signal by performing decoding through an MIMO decoder.

However, the UE generally receives signals from several neighbor cells including a service cell. In this case, the received signals undergo various situations, such as, for example, environments that there is a time offset according to arrival times of the received signals to the UE, CRSs collide with each other according to IDs of several cells, and there is no periodical interference in the data region according to cell operating methods. These situations cause performance degradation in interference cancellation channel estimation of the UE, resulting in decreasing the final reception performance thereof.

Thus, the second disclosure of the present specification proposes a channel estimation technique that can increase efficiency in implementation by enabling channel estimation with relatively low complexity even when the number of interference signals increases, and an interference cancellation technique that can improve reception performance through consecutive CRS interference cancellation.

Particularly, when two interference signals exist, the UE according to the second disclosure of the present specification may receive a signal from a serving cell, generate a first interference signal from the received signal based on a first CRS, which is transmitted by a first cell adjacent to the serving cell to cause interference in the received signal, remove the first interference signal from the signal, generate a second interference signal from the signal, from which the first interference signal is removed, based on a second CRS, which is transmitted by a second cell adjacent to the serving cell to cause interference in the signal, and remove the second interference signal from the signal, from which the first interference signal is removed.

Signal strength of the interference signal by the first CRS may only be greater than signal strength of the interference signal by the second CRS.

The UE may first remove a component corresponding to a CRS transmitted by the serving cell from the received signal when signal strength of the CRS transmitted by the serving cell is greater than signal strength of an interference signal by the first CRS.

The second disclosure of the present specification is described with reference to the drawings as follows.

Figure 26:
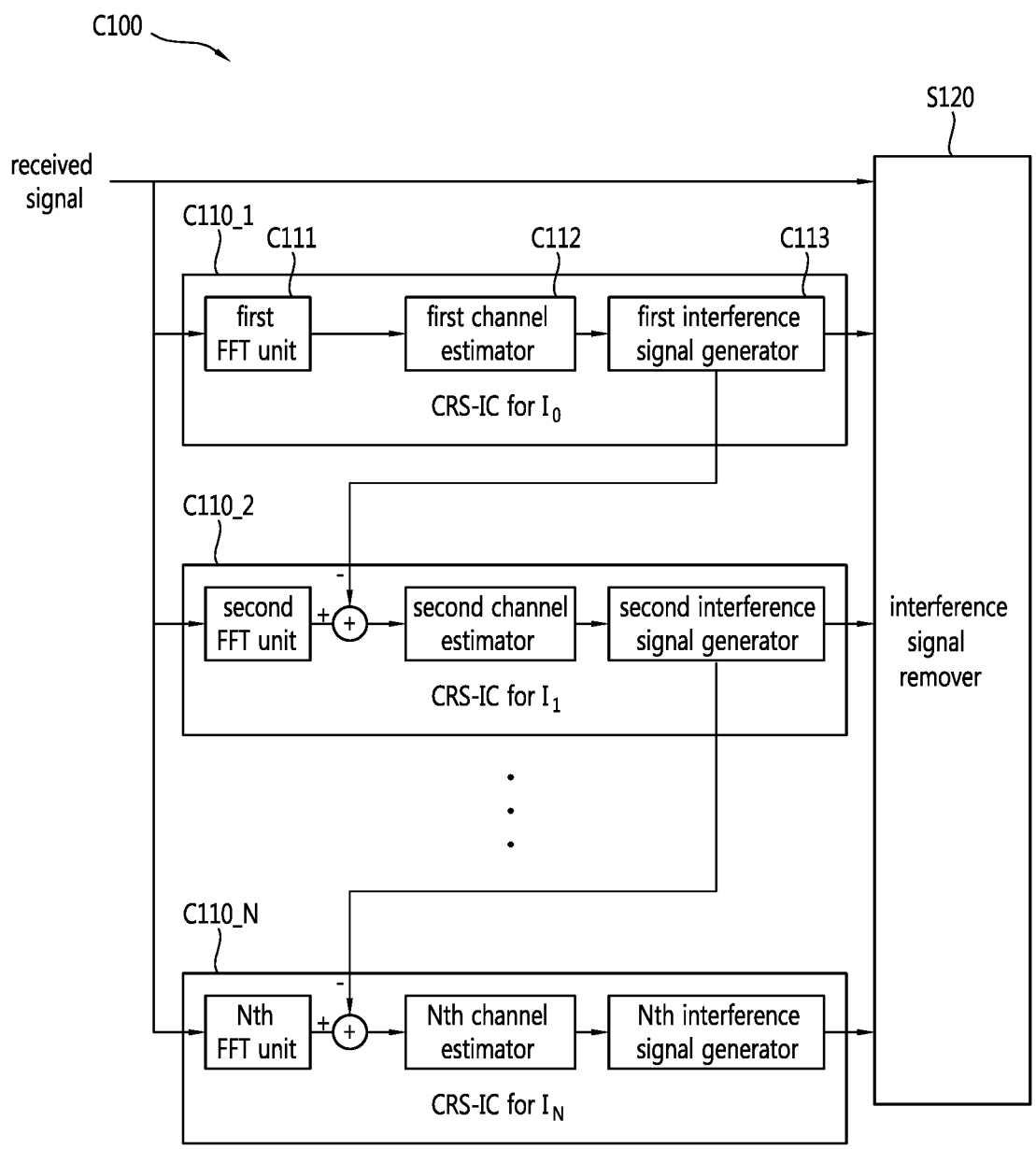
FIG. 26 is a block diagram illustrating an IRC device for a CRS according to an embodiment of the present invention.

FIG. 26 is a block diagram illustrating an IRC device for a CRS according to an embodiment of the present invention.

FIG. 26 illustrates a structure of the IRC device C100, which performs an interference cancellation function for CRS Interference Cancellation (CRS-IC), when two or more interference signals come from neighbor cells.

Referring to FIG. 26, the IRC device C100 in accordance with the second disclosure of the present specification adopts a consecutive interference cancellation technique.

Here, FFT and IFFT computation may use a general technique.

In accordance with the second disclosure of the present specification, the IRC device may estimate an average of path values in the vicinity away from about half of an FFT point, compared with a maximum value of a path profile, as noise for noise reduction and remove the noise.

The IRC device C100 according to the second disclosure of the present specification may use a received signal where FFT is performed at different times according to time information of each interference signal, and channel estimation is performed through a general channel estimation technique.

The IRC C100 may (re)generate an interference signal for consecutive interference cancellation and an interference signal for a serving cell.

The interference signal for consecutive interference cancellation may be regenerated on the basis of a time offset between an $n^{th}$ interference signal and an $(n+1)^{th}$ interference signal. A regeneration method may be equal or similar to a conventional interference cancellation method.

The interference signal for a serving cell may be (re)generated on the basis of a time offset between an $n^{th}$ interference signal and the serving cell. A regeneration method may be equal or similar to a conventional interference cancellation method.

The IRC device C100 according to the second disclosure of the present specification may remove the interference signal for consecutive interference cancellation from the received signal and, for example, may remove the $n^{th}$ interference signal from a received signal for the $(n+1)^{th}$ interference signal.

The IRC device C100 may remove all of the interference signals from a received signal for the serving cell to remove interference in the serving cell.

In particular, an interference cancellation process by the IRC device C100 according to the second disclosure of the present specification, is described with reference to FIG. 26 as follows.

The IRC device C100 generates interference signals in descending order of signal strength.

For example, when N interference signals $I_0$ to $I_N$ to be removed exist, the IRC device C100 may be configured to include N interference signal generators C110_1 to C110_N.

The N interference signal generators C110_1 to C110_N sequentially (re)generate interference signals, and a certain interference signal remover generates a corresponding interference signal based on a received signal, from which an interference signal is removed, in which strength of a signal generated by a previous interference signal remover is relatively large.

For example, the second interference signal remover C110_2 of FIG. 26 (re)generates a corresponding interference signal based on a signal, from which an interference signal (re)generated by the first interference signal remove C110_1 is removed.

An $M^{th}$ interference signal may, for example, be (re)generated on the basis of a signal in which an $(M-1)^{th}$ interference signal is removed from 1 with relatively larger signal strength.

After this, the IRC device C100 removes all of the (re)generated interference signals from the received signal through an interference signal canceller C120.

When signal strength of the serving cell is large, the interference cancellation technique for CRS-IC according to the second disclosure of the present specification, may perform the same interference cancellation in successive IRCs by considering a signal of the serving cell as an interference signal. For example, the remaining processes may be performed except only regeneration of a final interference signal for the serving cell.

Meanwhile, a collision between CRSs according to IDs of neighbor cells may occur or not.

Data may exist or not in interference signals received from neighbor cells according to cell operating methods.

When the UE includes an IRC device in in this environment, there is a need for varying input of the IRC device according to environments or cell operation.

Thus, the second disclosure of the present specification proposes an interference combining scheme for CRS-IC according to cell operating methods.

Particularly, the UE including the IRC device according to the second disclosure of the present specification may generate an interference signal from a received signal based on an interference CRS, which is transmitted by a cell adjacent to a serving cell to cause interference in the received signal, and may input a signal obtained by removing the interference signal from the received signal to the IRC device when a CRS transmitted by the serving cell collides with the interference CRS and the received signal includes ABSs.

The UE may input a signal before removal of the interference signal to the IRC device when a CRS transmitted by the serving cell collides with the interference CRS and the received signal does not include ABSs.

The UE may estimate a reception channel for the serving cell and generate the interference signal based on the estimated reception channel.

A path profile for estimating the reception channel may be updated by IIR filtering only when a CRS transmitted by the serving cell does not collide with the interference CRS and the received signal does not include ABSs.

When the received signal is divided into a first time section including ABSs and a second time section not including ABSs, a complex IIR filter used to estimate the reception channel may be initialized only while a CRS transmitted by the serving cell does not collide with the interference CRS and during transition from one of the first and second time sections to the other.

The UE may reduce noise by estimating the noise for the received signal. A path profile for estimating the noise may be updated by IIR filtering only when a CRS transmitted by the serving cell collides with the interference CRS and the received signal includes ABSs.

The UE may adjust a gain of an analog terminal for maintaining power of the received signal to a constant level, the gain of the analog terminal being adjustable only in a time section where the received signal does not include ABSs.

FIGS. 27a through 27d are views illustrating an example of input per operation of an IRC device according to an embodiment of the present invention.

Particularly, left drawings of FIGS. 27a through 27d illustrate a signal before interference cancellation per environment or operation, and right drawings of FIGS. 27a through 27d show a received signal after interference cancellation.

Figure 27A:
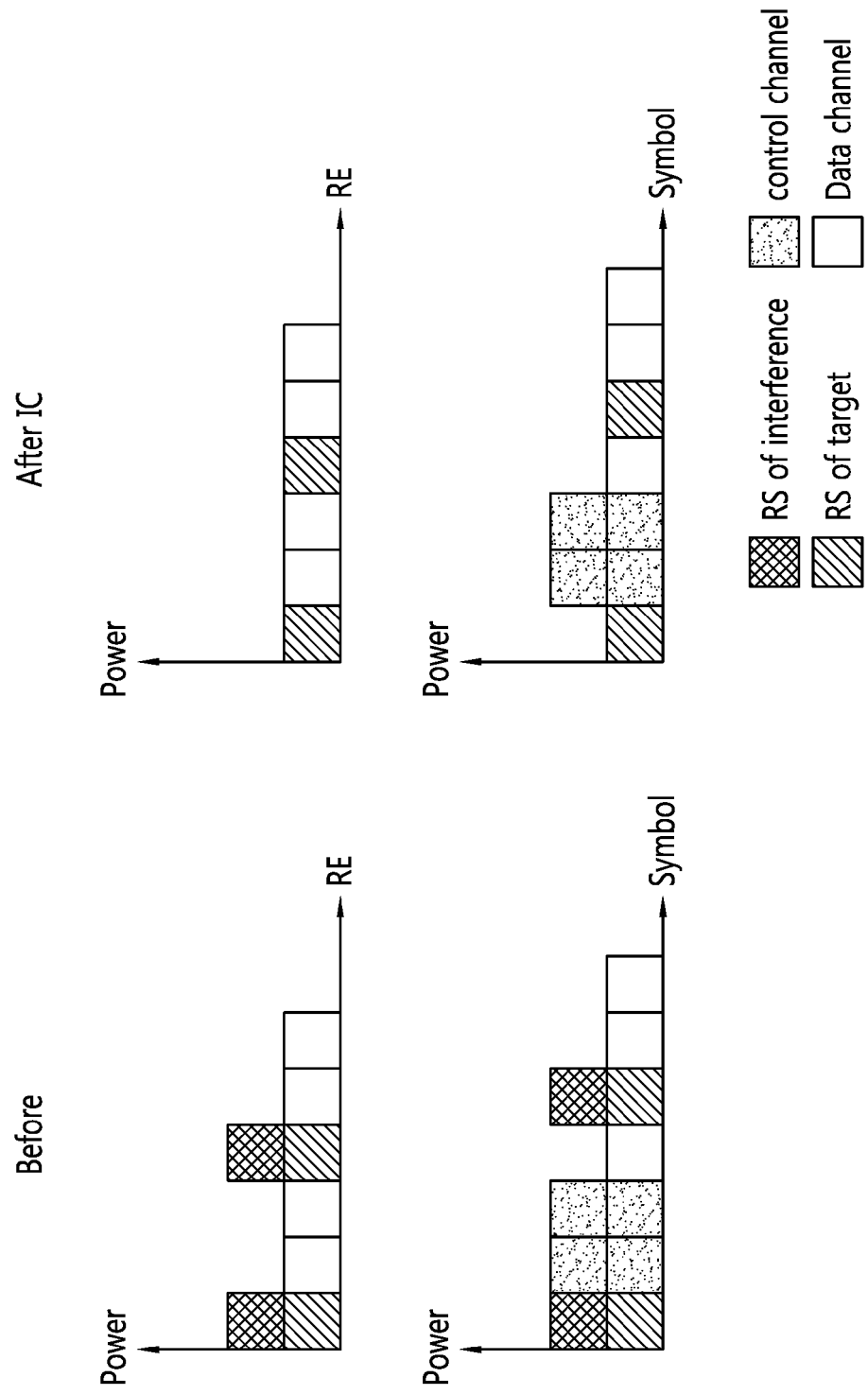
FIGS. 27a through 27d are views illustrating an example of input per operation of an IRC device according to an embodiment of the present invention.

FIG. 27a illustrates colliding and ABS cases. In this case, the received signal after interference cancellation needs to be input of the IRC device.

Figure 27B:
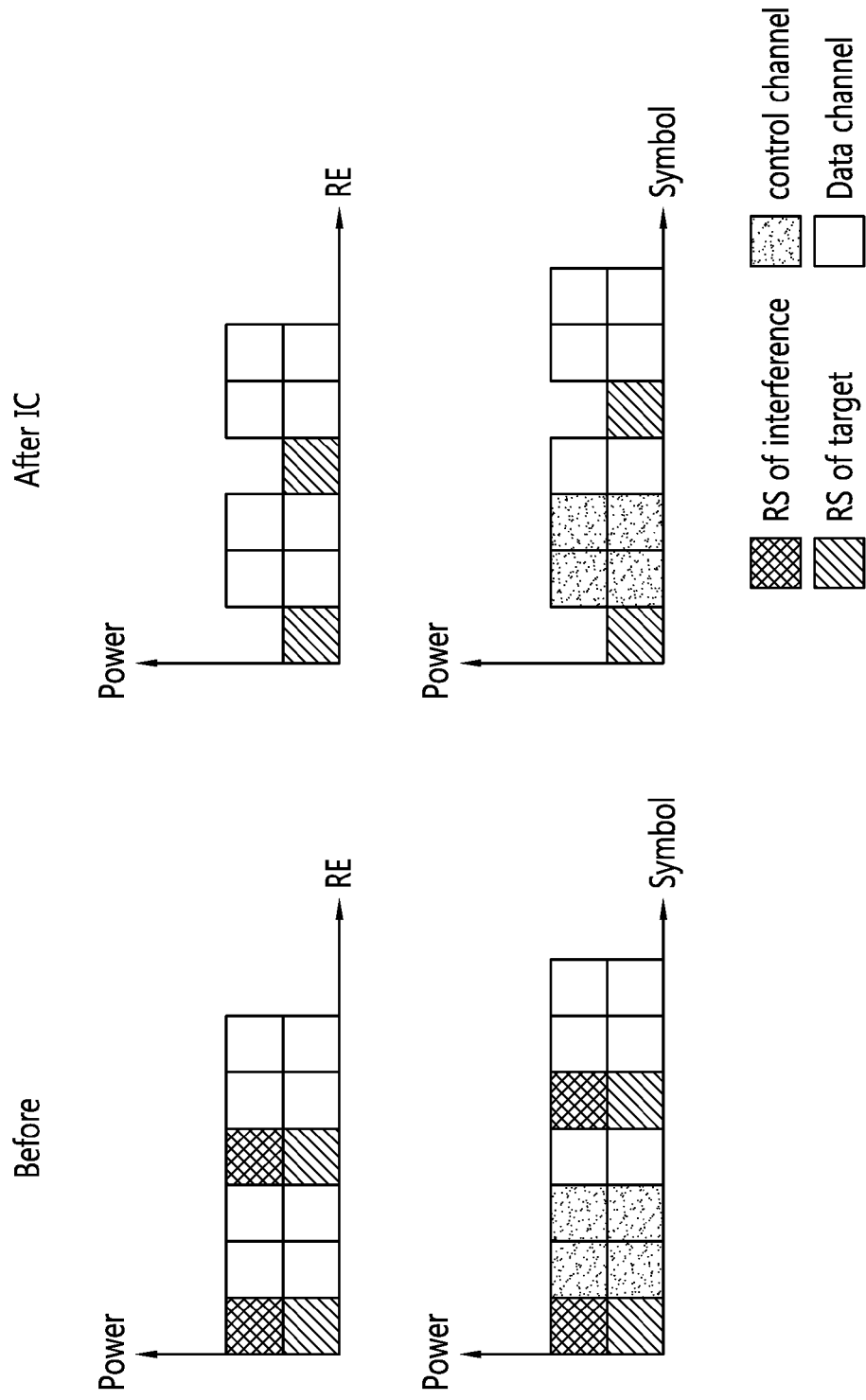

FIG. 27b illustrates colliding and non-ABS cases. In this case, the received signal before interference cancellation needs to be input of the IRC device.

Figure 27C:
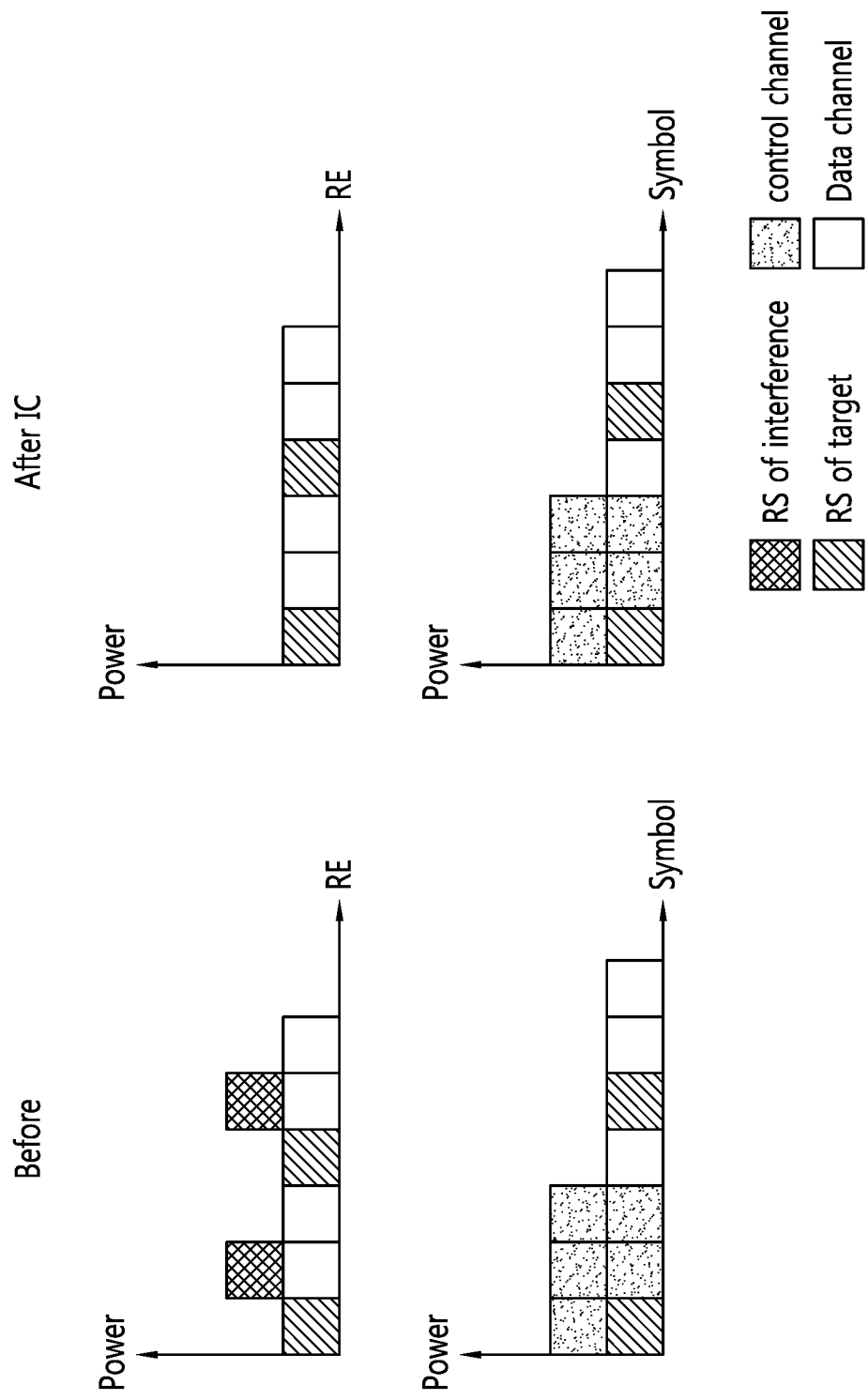

FIG. 27c illustrates non-colliding and ABS cases. In this case, the received signal before or after interference cancellation needs to be input of the IRC device.

Figure 27D:
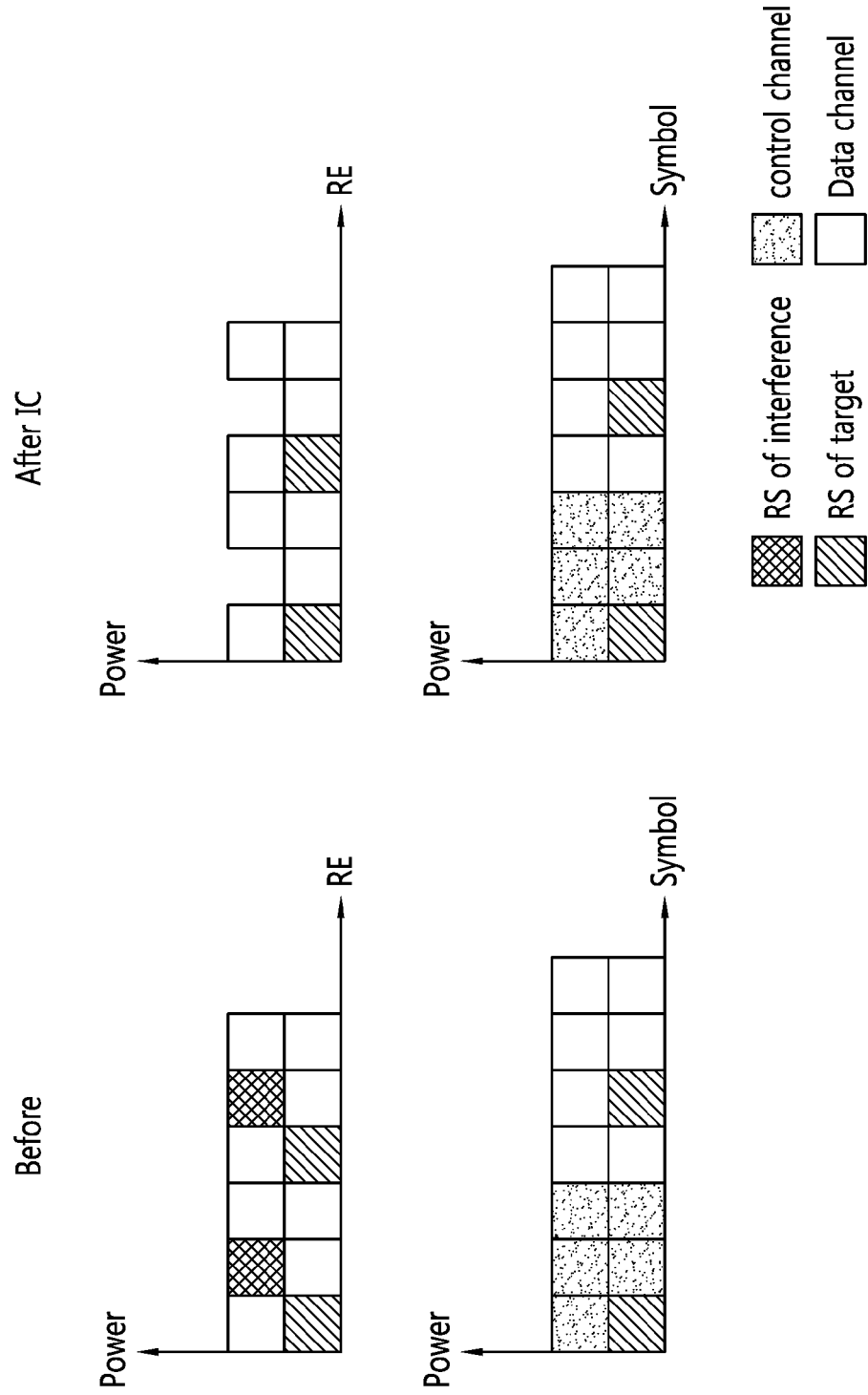

FIG. 27d illustrates non-colliding and non-ABS cases. In this case, the received signal before or after interference cancellation needs to be input of the IRC device.

Meanwhile, looking at the serving cell reception channel estimation method for CRS-IC according to cell operating methods according to the second disclosure of the present specification, a degree of interference affecting a CRS of the serving cell may vary according to the colliding/non-colliding or ABS/non-ABS cases, as illustrated in FIGS. 27a through 27d.

Thus, since a path profile for the serving cell is determined on the basis of a CRS of the serving cell, a method other than a conventional method needs to be applied to the path profile according to these environments.

For example, according to the second disclosure of the present specification, the serving cell reception channel estimation method for CRS-IC may be equal or similar to the conventional method in the colliding case, and may update the path profile by performing IIR filtering only in ABSs since an accuracy of an estimated channel decreases due to data on an interference signal in the non-colliding and non-ABS cases.

Since the complex HIR filter takes an inter-TTI average, output thereof is significantly changed according to colliding/non-colliding or ABS/non-ABS environments, and thus a method other than the conventional method needs to be applied to the complex IIR filter according to cell operating methods.

For example, according to the second disclosure of the present specification, the serving cell reception channel estimation method for CRS-IC may be equal or similar to the conventional method in the colliding case, may be performed equal to the conventional method in a section where a degree of interference affecting a CRS is analogous in the non-colliding case, and may initialize the IIR filter in a section of transition from the ABS case to the non-ABS case or vice versa.

On the other hand, the serving cell reception noise estimation technique for CRS-IC according to cell operating methods in accordance with the second disclosure of the present specification, may be equal or similar to the conventional method in the colliding case, and may update the path profile by performing IIR filtering only in ABSs since an accuracy of an estimated channel decreases due to data on an interference signal in the non-colliding and non-ABS cases.

On the other hand, the analog gain adjusting technique for CRS-IC according to cell operating methods in accordance with the second disclosure of the present specification, may perform analog gain adjustment before the IRC device to maintain constant power of a received signal.

Therefore, in the case of the non-colliding case according to cell operating methods, since the magnitude of a received signal measured according to the presence or absence of data on an interference signal varies, a value for analog gain adjustment is significantly changed, so that it is difficult to maintain constant power of the received signal.

Thus, according to the second disclosure of the present specification, analog gain adjustment may be performed only in the non-ABS section when the ABS/non-ABS section occurs unlike the conventional method.

As described above, use of the channel estimation method proposed in the second disclosure of the present specification may reduce complexity of channel estimation on an interference signal and increase efficiency in implementation by enabling channel estimation with relatively low complexity even when the number of interference signals to be estimated increases.

Using the noise reduction method may effectively remove noise from an estimated channel without an additional device for noise estimation.

The interference signal applicable to various cell deployment environments may be canceled by using the interference cancellation method and the reception channel estimation method, to which the channel estimation method and the noise reduction method proposed in the second disclosure of the present specification are applied.

The embodiments illustrated above may be implemented by various instruments. For example, the embodiments of the present invention may be implemented by hardware, firmware, software, or combinations thereof, which will be described in detail with reference to FIG. 28.

Figure 28:
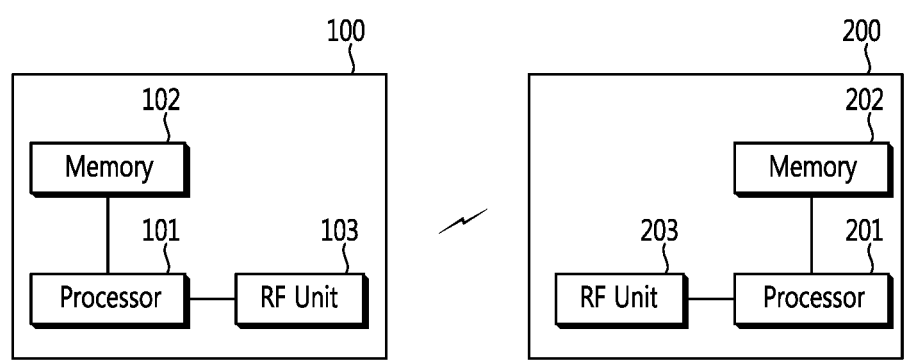
FIG. 28 is a block diagram illustrating a wireless communication system according to an embodiment of the present invention.

FIG. 28 is a block diagram illustrating a wireless communication system according to an embodiment of the present invention.

A BS 200 includes a processor 201, a memory 202, and an RF (radio frequency) unit 203. The memory 202 coupled to the processor 201 stores a variety of information for driving the processor 201. The RF unit 203 coupled to the processor 201 transmits and/or receives a radio signal. The processor 201 implements the proposed functions, procedure, and/or methods. In the aforementioned embodiment, an operation of the BS may be implemented by the processor 201.

A wireless device 100 includes a processor 101, a memory 102, and an RF unit 103. The memory 102 coupled to the processor 101 stores a variety of information for driving the processor 101. The RF unit 103 coupled to the processor 101 transmits and/or receives a radio signal. The processor 101 implements the proposed functions, procedure, and/or methods. In the aforementioned embodiment, an operation of the wireless device may be implemented by the processor 101.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The RF unit may include a base-band circuit for processing a radio signal. When the embodiment of the present invention is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

The UE that removes interference by a cell adjacent to the serving cell in the wireless communication system according to the embodiments of the present invention, may include an RF unit receiving a signal from the serving cell, and a processor obtaining PBCH information by decoding PBCH transmitted by a cell that neighbors a serving cell to cause interference in the received signal, estimating a channel for PBCH based on the PBCH information, generating an interference signal based on the PBCH information and the estimated channel for PBCH, and removing the generated interference signal from the received signal.

The UE that removes interference by a cell adjacent to a serving cell in the wireless communication system according to the embodiments of the present invention, may include an RF unit receiving a signal from the serving cell, and a processor generating a first interference signal from the received signal based on a first CRS, which is transmitted by a first cell adjacent to the serving cell to cause interference in the received signal, removing the first interference signal from the signal, generating a second interference signal from the signal, from which the first interference signal is removed, based on a second CRS, which is transmitted by a second cell adjacent to the serving cell to cause interference in the signal, and removing the second interference signal from the signal, from which the first interference signal is removed.

Here, signal strength of the interference signal by the first CRS may be greater than signal strength of an interference signal by the second CRS.

In the aforementioned exemplary systems, the methods are described on the basis of the flowchart with a series of steps or blocks, but the present invention is not limited to the order of the steps, and any step can be performed in order different from the other steps or simultaneously therewith. In addition, it should be understood to those skilled in the art that the steps shown in the flow chart are not exclusive, the other steps are included, or the one or more steps of the flowchart can be deleted without affecting the scope of the invention.

What is claimed is:

1. A method for removing interference by a User Equipment (UE) in a wireless communication system, the method comprising:

receiving a signal from a serving cell;

obtaining Physical Broadcast CHannel (PBCH) information by decoding a PBCH, wherein the PBCH is transmitted by a cell adjacent to the serving cell to cause interference in the signal;

estimating a channel for the PBCH based on the obtained PBCH information;

generating an interference signal based on the obtained PBCH information and the estimated channel for the PBCH; and removing the generated interference signal from the received signal, wherein the obtaining PBCH information comprises:

estimating a channel value through a Least Square (LS) estimator based on a Cell-specific Reference Signal (CRS) in a frequency domain;

removing noise from the channel value in a time domain;

performing time interpolation on the noise-removed channel value through a time estimator; and decoding the PBCH based on the time-interpolated channel value, wherein the LS estimator operates in a predetermined frequency bandwidth and sets a channel value corresponding to the frequency domain of a reception frequency bandwidth out of the predetermined frequency bandwidth as a channel value corresponding to a CRS location of both ends of the predetermined frequency bandwidth, when it is required that the channel value is estimated with a reception frequency bandwidth greater than the predetermined frequency bandwidth.

2. The method of claim 1, wherein the predetermined frequency bandwidth corresponds to 6 Resource Blocks (RBs).

3. The method of claim 1, wherein the estimating the estimating a channel for the PBCH comprises:
performing channel estimation based on the signal and the PBCH information;
producing an average of channel estimates in a predetermined Orthogonal Frequency Division Multiplexing (OFDM) symbol section; and
estimating a channel for the PBCH by performing frequency interpolation on the produced average.

4. The method of claim 1, wherein the estimation of the channel is performed through the LS estimator when there is a single receive antenna port and through Space Frequency Block Coding (SFBC) decoding when there are two or four receive antenna ports.

5. The method of claim 1, further comprising generating an interference signal by at least one PBCH and removing the generated interference signal from the received signal, when at least one neighbor cell other than a cell adjacent to the serving cell exists and a signal strength of at least one PBCH transmitted by the at least one neighbor cell is greater than a signal strength of a PBCH transmitted by a cell adjacent to the serving cell.

6. A User Equipment (UE) for removing interference by a cell adjacent to a serving cell in a wireless communication system, the UE comprising:
a Radio Frequency (RF) unit configured to receive a signal from the serving cell; and
a processor configured to:
obtain Physical Broadcast CHannel (PBCH) information by decoding a PBCH, wherein the PBCH is transmitted by a cell that neighbors the serving cell to cause interference in the signal,
estimate a channel for the PBCH based on the obtained PBCH information,
generate an interference signal based on the obtained PBCH information and the estimated channel for the PBCH, and
remove the generated interference signal from the received signal,
wherein the processor obtains the PBCH information by:
estimating a channel value through a Least Square (LS) estimator based on a Cell-specific Reference Signal (CRS) in a frequency domain;
removing noise from the channel value in a time domain;
performing time interpolation on the noise-removed channel value through a time estimator; and
decoding the PBCH based on the time-interpolated channel value,
wherein the LS estimator operates in a predetermined frequency bandwidth and sets a channel value corresponding to the frequency domain of a reception frequency bandwidth out of the predetermined frequency bandwidth as a channel value corresponding to a CRS location of both ends of the predetermined frequency bandwidth, when it is required that the channel value is estimated with a reception frequency bandwidth greater than the predetermined frequency bandwidth.

* * * * *